Figure 10:
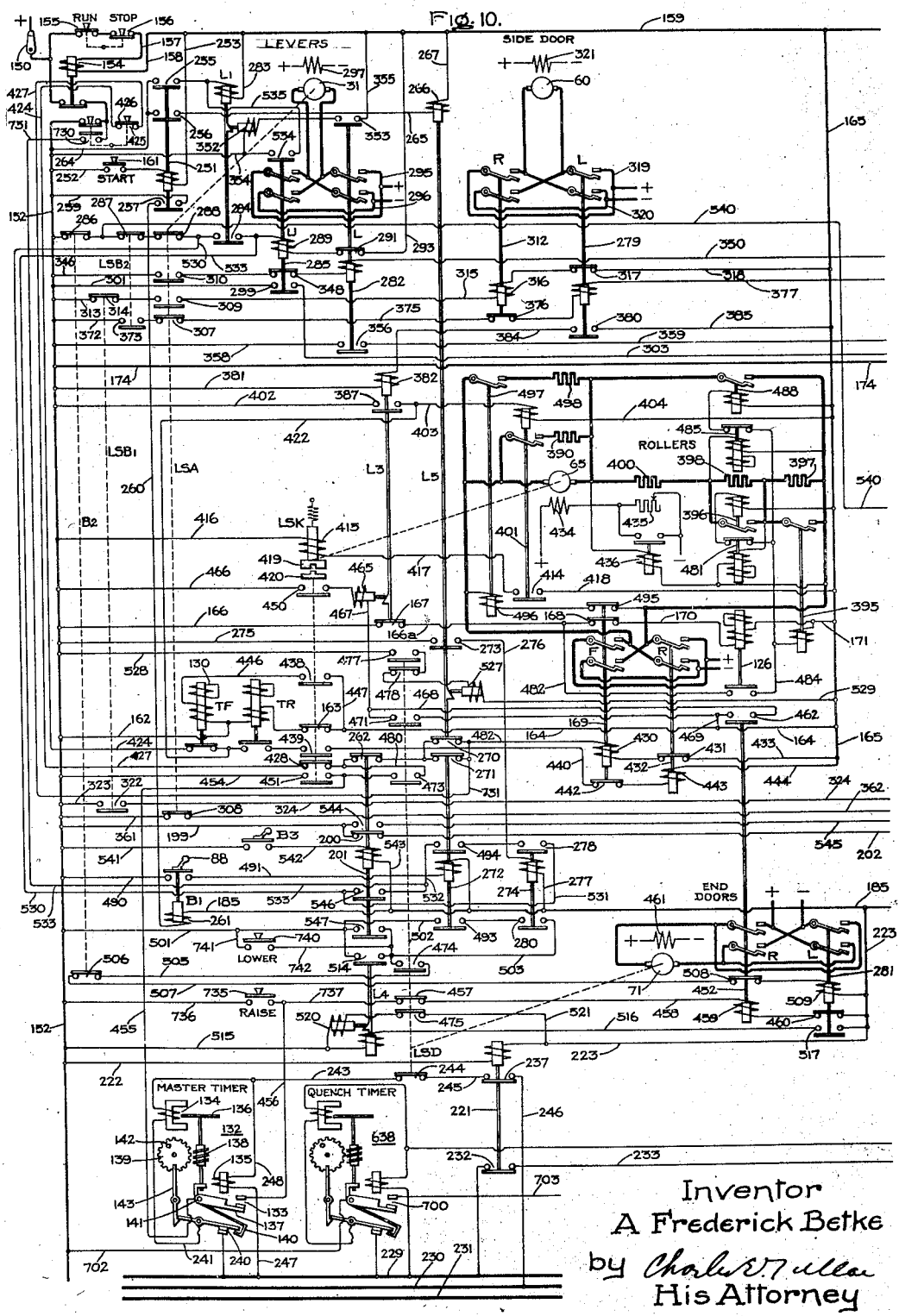

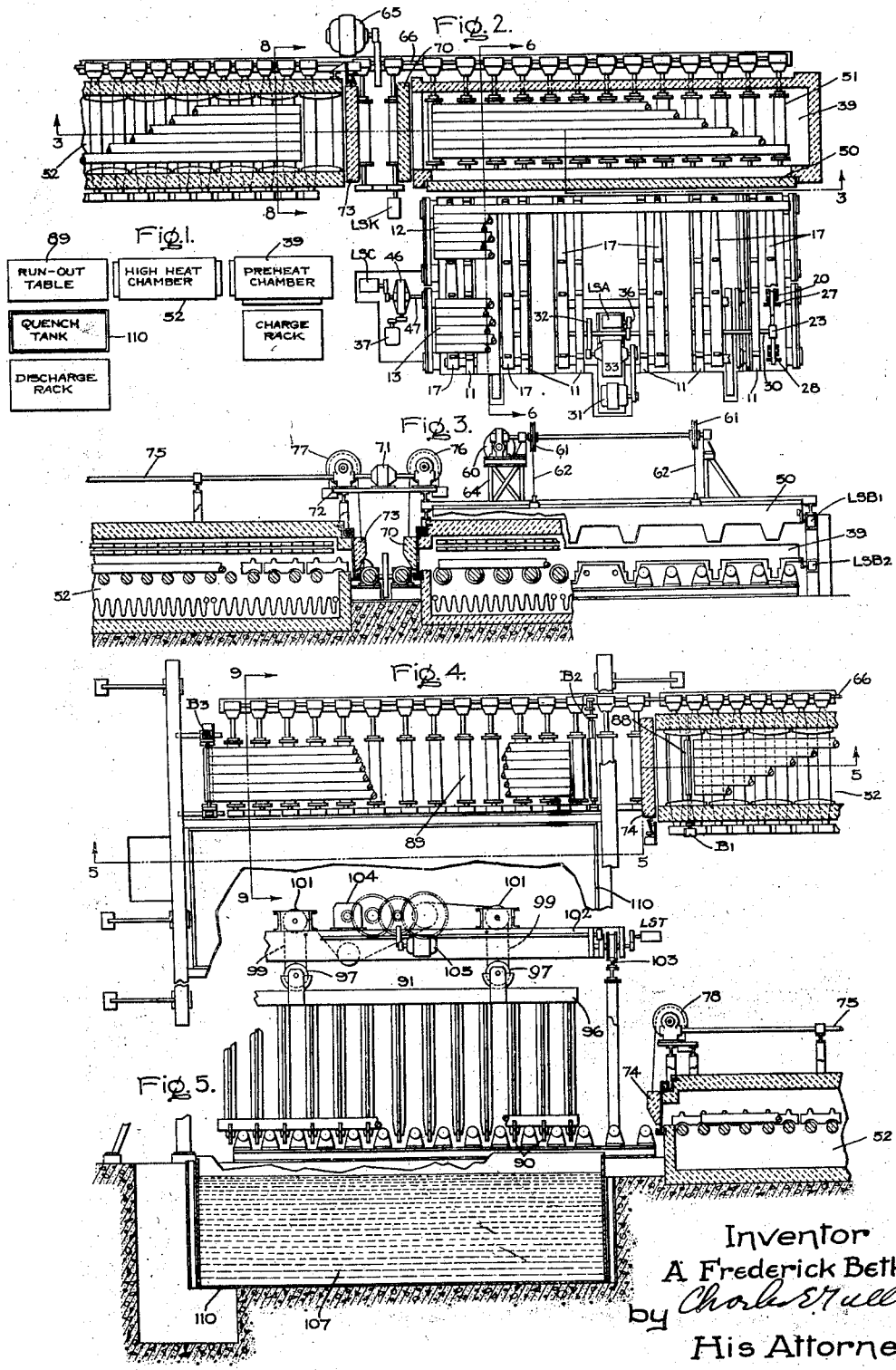

Aug. 7, 1934.    A F. BETKE    1,969,708
CONTROL SYSTEM FOR HEAT TREATING APPARATUS
Filed May 28, 1932    5 Sheets-Sheet 2
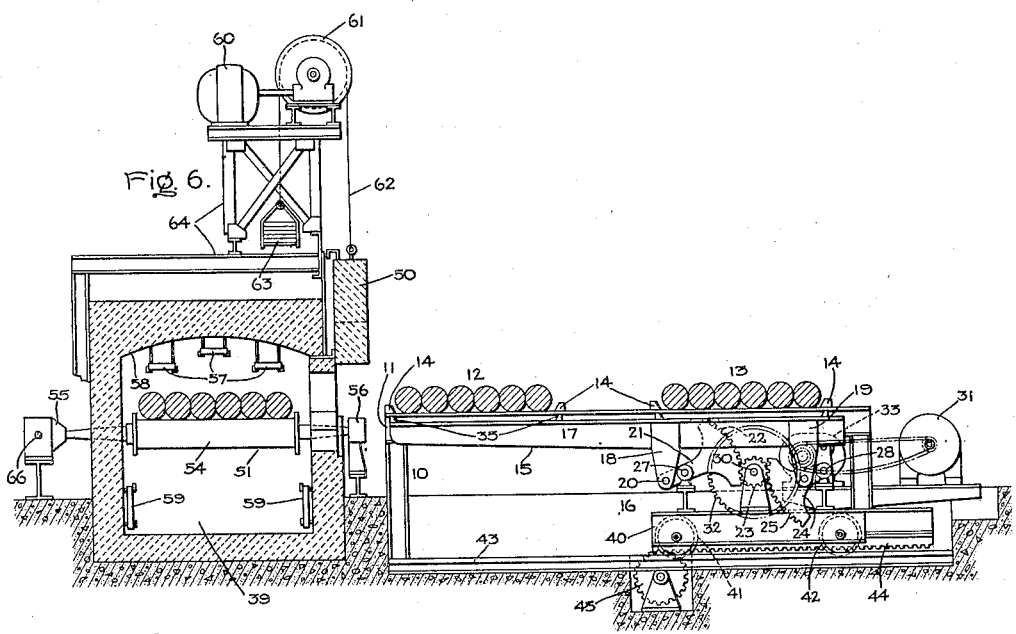
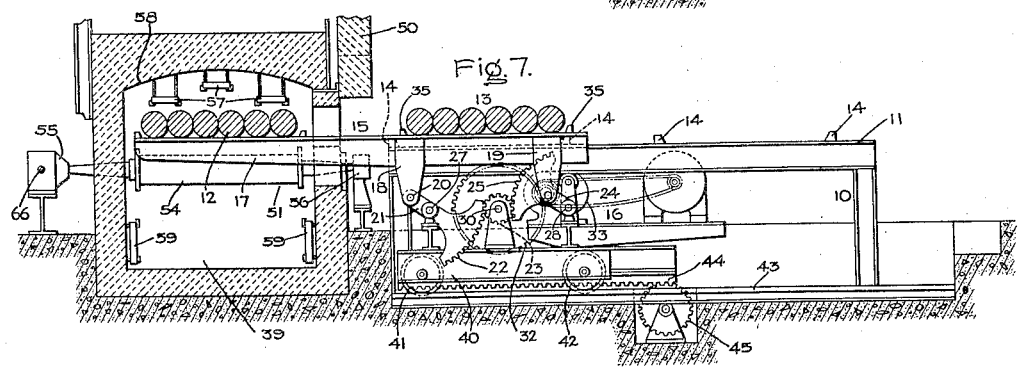
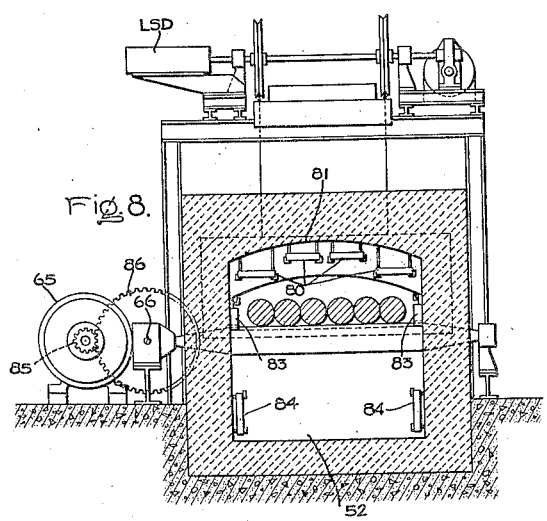
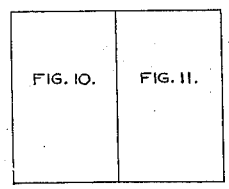
Inventor
A Frederick Betke
by Charles Muller
His Attorney

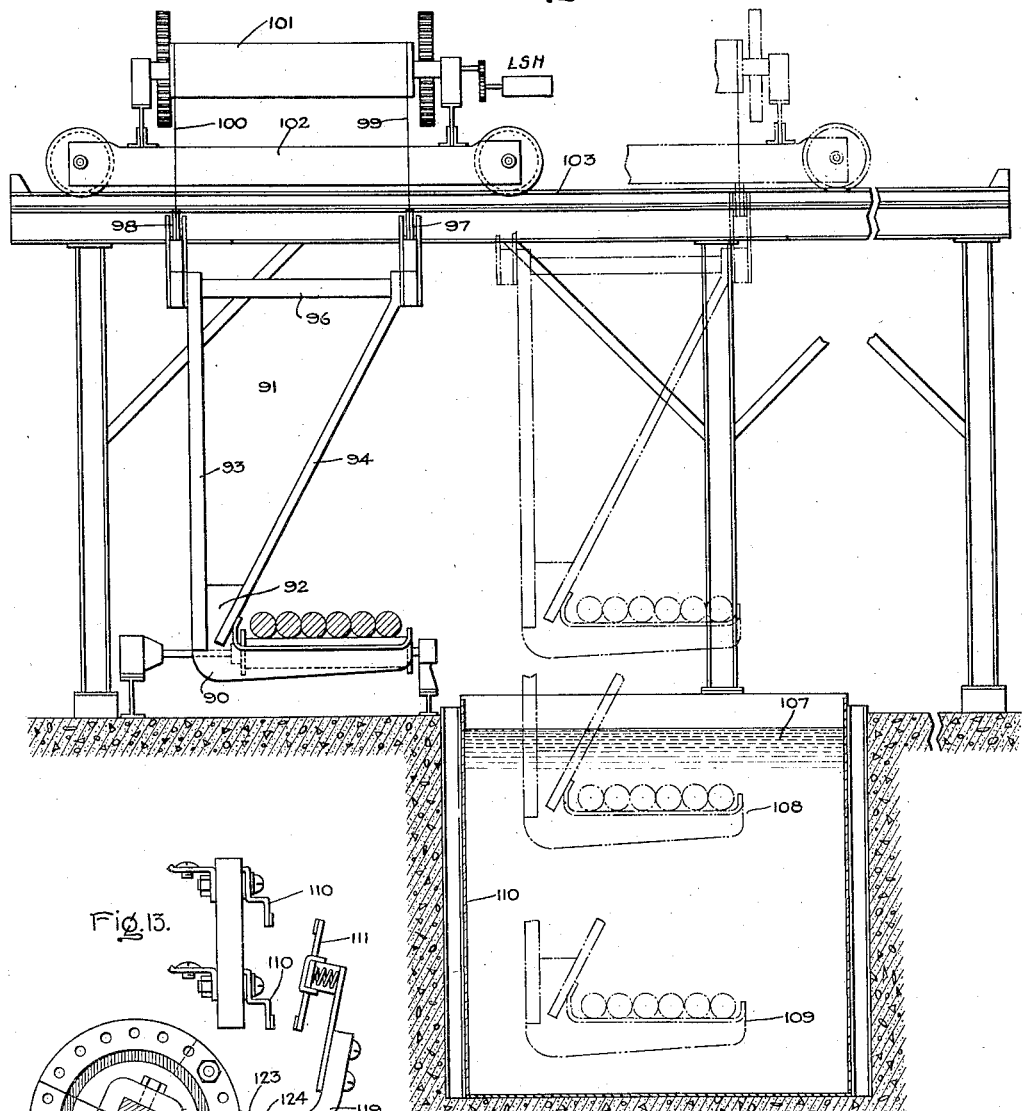

Aug. 7, 1934.  A F. BETKE  1,969,708
CONTROL SYSTEM FOR HEAT TREATING APPARATUS
Filed May 28, 1932  5 Sheets-Sheet 4

Inventor
A Frederick Betke
by Charles E. Mullen
His Attorney

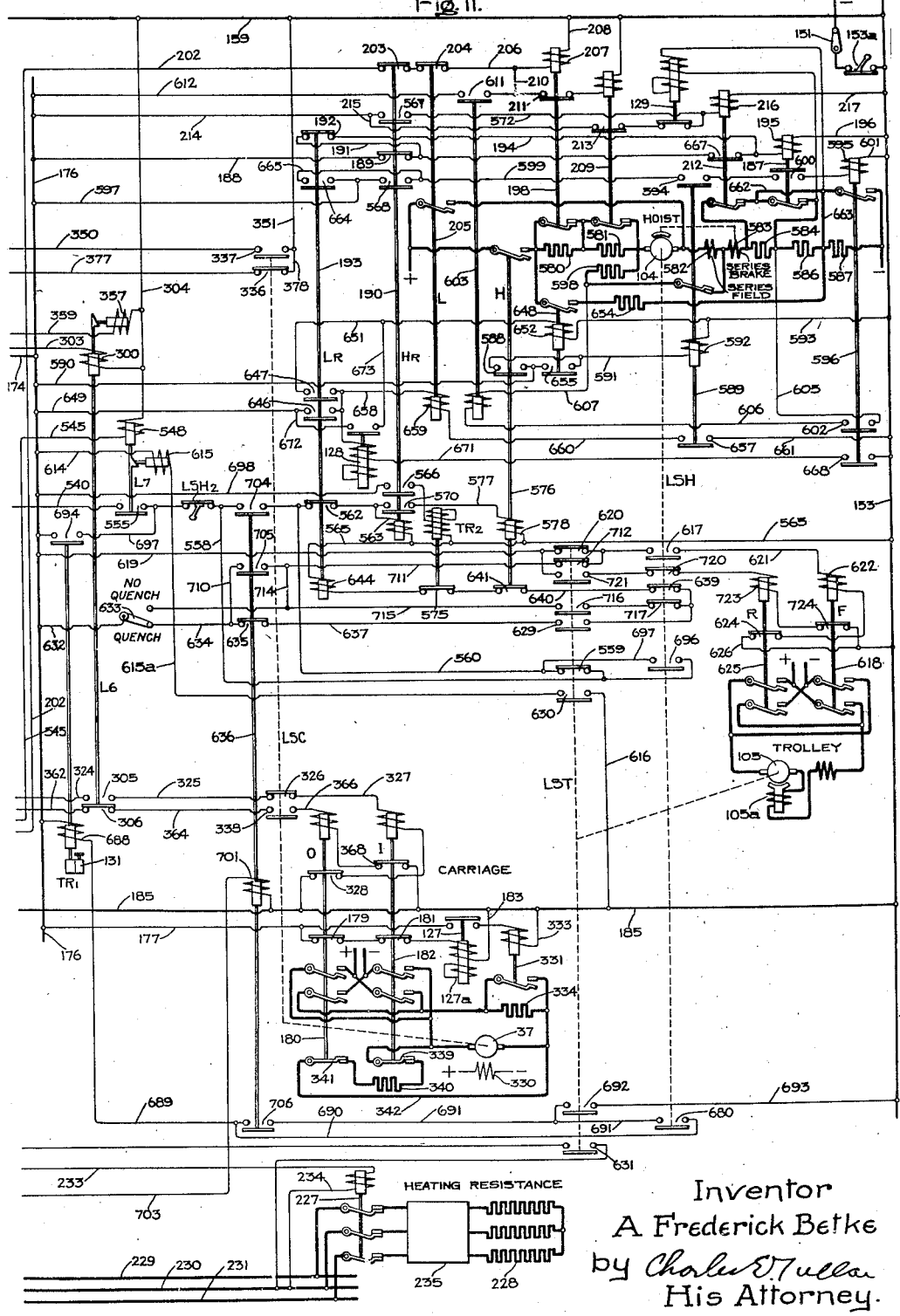

Patented Aug. 7, 1934

1,969,708

UNITED STATES PATENT OFFICE

1,969,708

CONTROL SYSTEM FOR HEAT TREATING APPARATUS

A Frederick Betke, Schenectady, N. Y., assignor to General Electric Company, a corporation of New York Application May 28, 1932, Serial No. 614,234

14 Claims. (Cl. 263—6)

My invention relates to control systems for heat treating apparatus, more particularly to systems for controlling heat treating apparatus for carrying out a plurality of heating and cooling operations in a predetermined sequence, and has for an object the provision of a reliable and flexible control system whereby the apparatus can be operated continuously in a manner to insure a uniform product.

My invention is particularly suitable for heat treating apparatus of the type described and claimed in a copending application of Carl L. Ipsen, Serial No. 614,173 filed May 28, 1932, and assigned to the same assignee as the present invention.

In the aforesaid Ipsen application there is described heat treating apparatus for tempering high carbon or alloy steel bars or the like, such as used for shafting. That apparatus comprises a plurality of heating chambers through which a charge supporting roll table extends and is arranged to form a run-out table at one end of the furnace. The rollers of the roll table are operated in synchronism with each other so that the charges may be oscillated during the heating operation. By rotating the rollers in a single direction the charges are caused to progress through the furnace. A charging mechanism is arranged at one side of the first heating chamber, known as the preheat chamber, and has for its function the introduction of charges of work into the preheat chamber. After a charge arrives on the run-out table located at one end of the furnace, a crane is arranged to transport the charge to a quenching bath. The crane is constructed so that the bars are supported in a horizontal plane. During the quenching operation the crane automatically raises and lowers the charge beneath the level of the quenching liquid, to cause the liquid to wash over the bars first in one direction and then in the other thereby insuring a uniform cooling of each bar throughout its length as well as the uniform cooling of the several bars.

In one of its aspects my invention relates to a reliable and efficient control system having great flexibility for heat treating apparatus of this type and wherein the proper sequence of operation is maintained in case of loss of power and the subsequent resumption of power.

For a more complete understanding of my invention reference should now be had to the drawings, in which Fig. 1 shows a lay-out chart of the several units of the apparatus; Fig. 2 shows a plan view of the charging mechanism, the preheat chamber and a fraction of the high-heat chamber; Fig. 3 is a sectional elevational view on the line 3—3 of Fig. 2; Fig. 4 shows a plan view of a fraction of the high-heat chamber and the run-out table; Fig. 5 shows an elevation of Fig. 4 taken on the line 5—5; Fig. 6 is an enlarged sectional elevational view taken on the line 6—6 of Fig. 2 showing the details of the charging mechanism with relation to the preheat chamber; Fig. 7 shows the charging mechanism in a position for inserting a charge of material into the preheat chamber; Fig. 8 shows an enlarged sectional elevation view taken on the line 8—8 of Fig. 2; Fig. 9 shows a sectional elevational view taken on the line 9—9 of Fig. 4; Figs. 10 and 11 illustrate one form of an electrical control system embodying my invention; Fig. 12 illustrates the relation of the control system of Figs. 10 and 11 to each other, while Fig 13 shows schematically the construction of a typical limit switch.

It is believed that a clear understanding of my invention will best be secured from a complete description of the operation of the system as a whole and therefore the construction and arrangement of individual portions of the furnace will first be described in detail.

The charging mechanism

The charging mechanism shown in Figs. 2, 6 and 7 forms no part of the present invention and it is fully described and broadly claimed in the copending application Serial No. 600,906, filed March 24, 1932—Smith and Deery—and assigned to the same assignee as the present invention. In the present application the charging mechanism will be described by saying that it consists of a stationary rack 10, the upper rails 11 of which are arranged to support groups of steel bars 12 and 13. These bars are held in position by means of the upwardly extending lugs 14. A charging fork 15 is supported by an elevating and transporting mechanism 16. The charging form 15 consists of a plurality of supports 17 supported in cantilever fashion by means of a plurality of downwardly directed extensions. Two of these extensions 18 and 19 are shown in Figs. 6 and 7. The extension 18 is pivotally connected at 20 to one end of a lever 21. On the other end of this lever there are provided a plurality of gear teeth 22 arranged to mesh with a driving gear 23. Similarly a lever 24 has gear teeth 25 meshing with the gear 23 and is pivotally connected to the downward extension 19. When the gear 23 is rotated in a counterclockwise direction the lever 21 rotating about its pivot point 27 exerts an upward thrust on the extension 18. Similarly the lever 24 rotating about its pivot point 28 exerts an upward thrust on the extension 19. The result is the raising of the fork 15. There are provided six sets of similar elevating mechanisms each being located beneath one of the fork supports 17. Referring to Fig. 2 it will be observed that one of the driving gears 23 is secured to a shaft 30 which extends the full width of the fork 15. The shaft is driven by a motor 31 which drives the gear 32, secured to shaft 30, thru a suitable speed reducer 33. As the fork is moved from the position shown in Fig. 6 to the position shown in Fig. 7, it will be seen that the steel bars 12 and 13 are transferred from the rails 11 to the fork 15. The lugs 35 provided on the charging fork maintain the bars in grouped relation so that they cannot shift from the positions shown. A limit switch LSA geared at 36 to the shaft 30 serves as a part of its function to deenergize the motor 31 as the fork is raised to its upper or charging position. Thereafter a motor 37 is energized to drive the fork 15 towards the preheat chamber 39. As shown in Figs. 6 and 7 this translational movement is made possible by a transporting carriage 40. The fork 15, the levers 21 and 24, and the motor 31 are supported on the carriage truck 40. The carriage wheels, 41 and 42 of which are shown, ride upon a track 43. Supported from the truck frame is a rack gear 44 arranged to mesh with a driving gear 45. The latter gear is driven by the motor 37 which is mechanically connected thru a suitable speed reducer 46 to the shaft 47, to which the gear 45 is secured. A limit switch LSC geared to the shaft 47, serves as a part of its function to control the energization of the motor 37.

The sequence of operation of the charging mechanism will be as follows:

*a.* The fork 15 raises the work from the rack.
    *b.* The side door 50 of the preheat chamber 39 is raised.
    *c.* The carriage 40 is moved towards the preheat chamber 39, this position being shown in Fig. 7.
    *d.* The fork 15 is lowered leaving the load 12 on the roll table 51 provided in the preheat chamber while the load 13 is transferred to the position on the rack that the load 12 formerly occupied.
    *e.* The carriage 40 is returned to its first position as shown in Fig. 6.
    *f.* The side door 50 is lowered.

*The preheat chamber*

The rollers 54 within the preheat chamber 39, forming a part of the roll table or roller hearth 51, are spaced sufficiently far apart to permit the fork 15 to be raised and lowered between them. Each roller is supported from the bearings 55 and 56 located outside of the furnace proper. The heating of the preheat chamber is accomplished by means of a plurality of resistances 57 supported from the arched ceiling 58, and the resistances 59 located beneath the roller hearth.

The side door 50 may be raised and lowered by any suitable hoisting means. As shown a motor 60 is geared to hoisting drums 61 upon which the door cables 62 are wound. The counterweights 63 are secured at one end of the respective door cables. The motor 60 and the hoisting drums 61 are supported by means of a superstructure 64 formed of steel beams or the like. Two track-type limit switches LSB1 and LSB2 (see Fig. 3) are arranged to be respectively operated as the side door comes into its upper and lower positions. They serve as a part of their function to deenergize the side door motor 60 as the door is driven to one or the other of its positions.

As soon as the charge 12 has been transferred to the preheat chamber 39 and the side door 50 has been lowered the rollers of the roll table 51 are driven first in one direction thru approximately 190 degrees, a time delay is introduced, and then they are driven in the other direction thru approximately 190 degrees. This oscillation is accomplished by means of a limit switch LSK arranged to control the energization of the roll table driving motor 65. This motor, as will be observed in Fig. 2, is geared to a shaft 66 which in turn serves to drive each roller of the roll table 51 thru suitable gearing.

The oscillation of the rollers constitutes an important feature of the Ipsen invention. If the rollers of the roll table were not reciprocated there would be cold spots on each roller corresponding to the points of support of the work on the rollers. The consequent greater heating of the remaining surface of the rollers would cause the weight of the work to deform the rolls. If it be remembered that these rollers may be called upon to support several thousand pounds of metal, it will be seen that the forces tending to cause deformation of the rolls are of considerable magnitude. By reciprocating the rollers in a manner to insure equal loading of the rollers, however, the deformation of the rollers is substantially or entirely eliminated. The heating of the work is more uniform inasmuch as the local cool spots are eliminated and the points of the work which are directly exposed to the heating resistances are constantly shifted.

After the charge has remained in the preheat chamber a predetermined length of time, an end door 70 of this chamber is raised by a motor 71 mounted on a superstructure 72. The motor 71 also raises the two end doors 73 and 74 of the high-heat chamber 52 by reason of a shaft 75 which is common to the hoisting drums 76 and 77 and 78 respectively arranged to raise and lower the end doors 70, 73 and 74. A limit switch LSD is geared to the hoisting drums 77 (see Fig. 8) and serves as a part of its function to deenergize the motor 71 as the doors reach one or the other of their limits.

The motor 65 is then energized to drive the rollers in a direction to transport the load of bars from the preheat chamber 39 to a high heat chamber 52.

*The high heat chamber*

The high heat chamber as shown in cross section in Fig. 8 is very similar in construction to the preheat chamber 39. Since the temperature of the high heat chamber is normally much higher than the temperature of the preheat chamber more resistances 80 are provided on the arched ceiling 81. Additional heating resistances 83 are also provided along the side walls as well as above the roller-way while the resistances 84 beneath the rollerway complete the provision for heat generation within this chamber.

Inasmuch as the motor 65 drives the rollers thru the gears 85 and 86, the shaft 66, and the individual roller gears (not shown) it will be seen that the oscillation of the work occurs in the high heating chamber 52 in the same manner and for the same reasons as described in connection with the preheat chamber 39. However, when the first load reaches the high heat chamber 52, a bumper switch B1 is arranged to be operated from its open position to a normally closed position. The operation of this switch is accomplished by the leading end of the charge striking a pivoted member 88 which is thereby rotated to close the switch B1. This switch is only operated by the first charge entering the high heat chamber 52 and serves to deenergize the roll motor 65. After the expiration of a predetermined time interval, the length of which depends upon the size of the work undergoing heat treatment, the end doors 70, 73 and 74 are again raised and the work is transported by the roll table to the runout table 89, and the charge in the preheat chamber 39 is transferred to the high heat chamber 52. As the charge leaves the high heat chamber a second bumper switch B2 located between the runout table and the high heat chamber is operated by the charge to open its normally closed contacts 286 and 506 so that neither the end doors nor the crane may be operated until the charge is completely out of the furnace.

The runout table

The runout table 89 consists of an extension of the roll table. However, the rollers are spaced sufficiently far apart to permit the carriers 90 provided on the crane 91 to travel between them. A third bumper switch is provided on the end of the runout table 89 farthest from the high heat chamber. The contacts of this switch are normally biased to their open position and are closed whenever the work strikes an operating roller of this switch arranged in the path of the work. This bumper switch B3 serves to deenergize the roll motor 65 as the charge reaches its full outermost position on the runout table.

The crane

The carriers 90 are supported from one end 92 by the steel supports 93 and 94. These supports are secured to a framework 96 which has mounted upon it a plurality of pulleys, 97 and 98, two of which are shown in Fig. 9. About these pulleys are threaded the supporting cables 99 and 100 which are secured to the hoisting drums 101. A truck 102 mounted on a track 103 supports the hoisting drums 101 as well as the hoisting motor 104 and the trolley motor 105. The track 103 extends over a quenching tank 110 and a discharge rack (not shown). A pair of geared limit switches LSH and LST are respectively provided for controlling the energization of the hoisting motor 104 and the trolley motor 105. There is also provided a track-type limit switch LSH2 operated by the crane to deenergize the hoisting motor 104 whenever the carriers 90 are hoisted to a position a predetermined distance above the runout table. The sequence of operation is then as follows:

a. Work is received on the runout table 89 from the high heat chamber 52.
b. Crane picks work up and transports it to quenching tank 110.
c. Work is lowered to a substantial depth in quenching liquid 107.
d. Crane oscillates up and down between broken line positions 108 and 109 beneath surface of the quenching liquid for predetermined length of time.
e. Work is hoisted from quenching tank 110 and is transported to discharge rack.
f. Crane is returned to the runout table 89 for the next load.

The relative movement between the quenching liquid 107 and the work causes a flow of the liquid over the work or steel bars. This washing action of the liquid over the surface of the steel bars aids in securing uniform properties of the bars thruout their lengths; that is to say, one part of a bar is not quenched so that it is harder than another part.

The automatic control system

It is believed that a clear understanding of the arrangement and operation of the various parts of the control system will be best understood from a complete description of the operation of the system as a whole, and therefore the construction and arrangement of certain typical devices only will be first described in detail.

The limit switches LSA, LSK, LSD, LSC, LST and LSH are constructed as shown in Fig. 13. Each pair of contacts 110 are arranged to be bridged by a conducting member 111, pivotally mounted at 112 on a support 113. A spring 114 normally biases the conducting member 111 away from the contacts 110. A lug or cam 115 is secured to a disk 116 mounted on a shaft 117, and serves to cooperate with a roller 118 carried by the contact arm 119 so as to operate the conducting segment 111 to close the contacts 110. As the contact arm 119 is rotated about its pivot 112, its lower end 120 is engaged by a latching member 121 holding it in its closed position. The latching member 121 is biased against the lower end 120 of the switch member 119 by a spring 122. A second lug or cam 123 is arranged to engage a roller 124 so that the latching member 121 may be rotated about its pivot point releasing the switch member 119 so that the spring 114 may operate the switch member to open the contacts 110. It will therefore be observed that the limit switch contacts require positive operation for both the opening and the closing of the contacts.

A plurality of sequence relays L1, L2, L3, L4, L5, L6 and L7 are arranged so that when an energizing circuit is completed for one of the sequence relays, it will be operated and latched into position. In other words, it will require a second circuit to be completed to unlatch the sequence relay so that it may be operated into its unlatched position. By means of this type of relay the sequence of operations will not be disturbed even though there is a power failure. This will be seen by observing that the relays and contactors normally held closed by reason of energizing circuits completed thru the contacts of the sequence relays, upon power failure will be operated to their open positions. As soon as there is a resumption of power, however, the relays and contactors will be closed, inasmuch as the sequence relays maintain the energizing circuits.

The timing relays TF, TR, 126, 127, 128, 129 and TR2 are similarly constructed. For example, timing relay TF (Fig. 10) is provided with a short circuited coil 130. After the operating coil of the relay TF has been energized to cause its contacts to be opened and thereafter its energizing circuit is broken, it will be understood that the short circuited coil 130 serves to decrease the rate of decay of the magnetic flux thereby maintaining the contacts of the time relay open for a predetermined time interval. A timing relay TR1 is provided with a suitable device 131 arranged to delay the closing of the contacts of this relay.

A master timer 132 is arranged to control the length of time a charge shall remain in one of the heating chambers. This timer has a pair of contacts 133 which are normally open. When the timer is in operation alternating current is applied to its motor 134 and to the operating coil 135. The armature 136 of this motor is thereby rotated and by reason of the magnetic attraction of the coil 135 exerted on a magnetic member 137, the worm gear 138 is rotated into engagement with the gear 139. Just enough movement is permitted by a stop member 140 so that the worm gear 138 may be moved about the pivot 141 into meshing engagement with the gear 139. However, the stop member 140 does not permit the closing of the contacts 133. As soon, however, as the outwardly extending projection or tripping member 142 carried by the gear 139 strikes the latching member 143, the coil 135 closes the contacts 133. By varying the position of the tripping member 142 with respect to the latching member 143, it will be observed that the time required for the closing of the contacts 133 may be varied. A similar timer 638 is arranged to control the time required for the quenching operations.

It is now believed that a comprehensive understanding of the system, including the construction and arrangement of various devices, will be facilitated by a description of the operation of the system as a whole.

Referring to Figs. 10, 11 and 12, a pair of line switches 150 and 151 are shown closed, so that the supply lines 152 and 153 are connected to a suitable source of direct current supply (not shown). The supply line 152 is connected to the source of supply by means of an undervoltage relay 154 which is energized through a circuit which may be traced through the line switch 150, push button stations 155 and 156, conductor 157, operating coil of the relay 154, and by conductors 158 and 159 to the other supply line 153. It will be observed that the supply line 152 serves as the origin of all of the control circuits and therefore if there should be a voltage failure of the supply source, all of the control circuits will be deenergized by reason of the opening of the relay 154. The stop push buttons 155 and 156 may be multiplied indefinitely, that is to say, fifteen or twenty of these push buttons may be distributed at various points about the furnace so that in case of the occurrence of an abnormal condition, the operator may deenergize all of the control circuits by simply pressing a stop push button, which it will be observed, interrupts the circuit to the relay 154.

It will be observed that the supply line 153 is connected to the source of supply by a normally closed switch 153A. While only one of these switches is shown in Fig. 11 of the drawings it is to be understood that each door may be provided with a similar switch. Should the work come into engagement with an end door thereby causing the end door to be swung outwardly from its supporting cables, all of the control circuits will be deenergized by the opening of the switch 153A.

To clarify the description, the line switches 150 and 151 are shown closed. Consequently a number of contactors and relays are shown in their energized positions before the start push button 161 has been depressed to initiate the automatic operation of the furnace. For example, an energizing circuit for the timing relay TR may be traced from the supply line 152, by conductor 162, operating coil of the timing relay TR, contacts 163 of the limit switch LSK, and by conductors 164, 165 and 159 to the other supply line 153. An energizing circuit for the first accelerating relay 126 of the roll motor 65 may be traced from supply line 152, by conductor 166, normally closed contacts 167 of the sequence relay L3, conductor 166A, contacts 168 of the forward direction switch 169 provided for the roll motor 65, conductor 170, operating coil of the relay 126, and by conductors 171, 165 and 159 to the other supply line 153. A similar accelerating relay 127 provided for the carriage motor 37 is energized through a circuit which may be traced from the supply line 152 by conductors 174, 176, 177, contacts 179 provided on the direction switch 180 for the out-motion of the carriage motor 37, interlock contacts 181 provided on the direction switch 182 for the in-motion of the carriage, operating coil of relay 127, and by conductors 183 and 185 to the other supply line 153. A field accelerating contactor 187 of the hoist motor 104 is closed by reason of an energizing circuit which may be traced from supply line 152, by conductors 174, 176, 188, contacts 189 of hoisting relay 190, conductor 191, contacts 192 of the lowering relay 193, conductor 194, operating coil 195 of the contactor 187 and by conductor 196 to the other supply line 153. An accelerating contactor 198 provided for the crane hoisting motor 104 is energized by reason of a circuit which may be traced from the supply line 152, by conductor 199, contacts 200 provided on the relay 201, conductor 202, interlock contacts 203 provided on the hoisting relay 190, interlock contacts 204 provided on a lowering direction switch 205, conductor 206, operating coil 207 of the contactor 198, and by conductors 208 and 159 to the other supply line 153. An energizing circuit for the accelerating contactor 209 is derived by means of a conductor 210 from the energizing circuit for the contactor 198 and is completed through the contacts 211 operated with the contactor 198, operating coil of contactor 209 and by conductor 159 to the other supply line 153. The completion of the energizing circuit of the field accelerating contactor 212 of the hoist motor depends on the contacts 213 operated with the contactor 209. This circuit may be traced from supply line 152 by conductors 174, 176, 214, 215, contacts 213 of the contactor 209, contacts of the relay 129, operating coil 216 of the contactor 212 and by conductor 217 to the other supply line 153.

An undervoltage relay 221 is provided to protect the furnace and the work from overheating in case of power failure of the direct current source of supply. Its energizing circuit may be traced from the supply line 152 by conductor 222, operating coil of the relay 221, and by conductors 223 and 185 to the other supply line 153. An energizing circuit for a contactor 227, arranged to connect the heating resistors designated at 228 and located in the preheat and the high heat chambers to a suitable three phase source of supply as is indicated by the supply lines 229, 230 and 231, may be traced from the supply line 229, contacts 232 of the undervoltage relay 221, conductor 233, operating coil of the contactor 227, and by conductor 234 to the other supply line 230. A control panel 235 is provided with a number of control switches (not shown) which serve to complete the power circuits from the three phase source of supply to the various heating resistors employed for the heating of the furnace.

The contacts 237 provided on the undervoltage relay 221 serve to complete an energizing circuit for the master timer 132.

The circuit for the timer motor 134 may be traced from the alternating current supply line 229, contacts 240 of the timer, conductor 241, motor winding of the timer, conductor 243, contacts 244 of the end door limit switch LSD, conductor 245, contacts 237 of the undervoltage relay 221, and by conductor 246 to the other supply line 230. The circuit to the operating coil 135 of the timer may be traced from the supply line 229 by conductor 247, coil 135, conductors 248 and 243, contacts 244 of the end door limit switch LSD, conductor 245, contacts 237, of undervoltage relay 221 and by conductor 246 to the other supply line 230. It will therefore be observed that as soon as voltage is applied to the supply lines 152 and 153 and to the alternating current supply lines 229, 230 and 231, the master timer 132 begins timing in the manner that has already been explained.

For the sake of clarity of description it will be assumed that the initial heating of the furnace has been completed and that the preheat chamber 39 and the highheat chamber 52 have been brought up to their normal operating temperatures.

To initiate the automatic operation of the furnace under the conditions assumed and with the various parts in the positions shown in Figs. 10 and 11, a normally open start button 161 is momentarily depressed to establish an energizing circuit for a normally open relay 251. This circuit may be traced from supply line 152, by conductor 252, push button 161, operating coil of the relay 251, and by conductors 253 and 159 to the other supply line 153. The relay 251 is thereupon closed to complete energizing circuits through its contacts 255, 256 and 257.

The bumper switch B1, which it will be remembered is located in the high heat chamber 52, is rendered effective by reason of the completion of its energizing circuit by the contacts 257 of the relay 251. This circuit may be traced from the supply line 152 by conductor 259, contacts 257 of the relay 251, conductor 260, operating coil 261 of the bumper switch B1, and by conductor 185 to the other supply line 153. The contacts of the bumper switch B1 are thereupon opened and the pivoted member 88 (see Fig. 4) is moved into the path of the work. This bumper switch serves to deenergize the roll table motor 65 as the first charge of work arrives in the high heat chamber from the preheat chamber. Thereafter this bumper switch is not effective, inasmuch as the roll motor for subsequent operation is deenergized by the opening of the contacts 262 of the relay 201, which relay is operated due to the closing of the contacts of the bumper switch B3 located on the outer end of the run-out table 89 (see Fig. 4).

Incident to the closing of the contacts 256 of the relay 251 the sequence relay L5 is operated to its latched-in position by reason of an energizing circuit which may be traced from the supply line 152 by conductor 264, contacts 256 of the relay 251, conductor 265, operating coil 266 of the sequence relay L5, and by conductors 267 and 159 to the other supply line 153. The opening of the contacts 270 of this relay removes a shunt circuit around the contacts 271 of the relay 272, and inasmuch as this relay operates to open its contacts 271 following the operation of the bumper switch B1, it will be seen that the energizing circuit for the forward direction switch 169 of the roll motor 65 may thereby be interrupted. The closing of the contacts 273 of the sequence relay L5 causes the closing of the relay 274 by reason of the completion of its energizing circuit. This circuit may be traced from the supply line 152 by conductor 275, contacts 273, of the sequence relay L5, conductor 276, operating coil of the relay 274, and by conductors 277 and 185 to the other supply line 153. The contacts 278 of the relay 274 serve partially to complete an energizing circuit for the direction switch 285 of the cams, while the relay contacts 280 serve partially to complete an energizing circuit for the lower direction switch 281 of the end door motor 71.

The closing of the contacts 255 of the relay 251 completes an energizing circuit for the sequence relay L1, which circuit may be traced from supply line 152, by conductor 264, contacts 255, operating coil of the sequence relay L1, and by conductors 283 and 159 to the other supply line 153. The sequence relay L1 is thereupon operated to its latched-in positioin with its contacts 284 closed. The closing of these contacts completes an energizing circuit for the up-direction switch 285 of the lever motor 31. This circuit may be traced from the supply line 152, by contacts 286 of the bumper switch B2, contacts 287 of the side door limit switch LSB2, contacts 288 of the cam limit switch LSA, contacts 284 of the relay L1, operating coil 289 of the direction switch 285, interlock contacts 291 of the lower direction switch 282 of the cam motor, and by conductors 293 and 159 to the other supply line 153.

The closing of the up-direction switch 285 serves to connect the armature of the motor 31 by conductors 295 and 296 to a suitable source of direct current supply as is designated by the positive and negative symbols. A separately excited field winding 297 for this motor is similarly energized, as indicated, from a suitable source of direct current supply. The lever motor 31 is thereupon caused to rotate in a direction to raise the charging fork 15 as previously described. It will be understood that accelerating contacts may be employed to accelerate the motor 31 though these have been omitted for the purpose of simplifying the drawings.

When the up direction switch 285 closed, the contacts 299 operated with this switch were closed to establish an energizing circuit for the operating coil 300 of the sequence relay L6. This circuit may be traced from the supply line 152 by conductor 301, contacts 299 of the direction switch 285, conductor 303, operating coil 300 of the sequence relay L6, and by conductors 304 and 159 to the other supply line 153. The sequence relay L6 is thereupon operated and latched into position with its contacts 305 closed partially to complete an energizing circuit for the in-direction switch 182 of the carriage motor 37. At the same time the contacts 306 of the relay L6 are opened to prevent the completion of an energizing circuit for the out direction switch 180. The interlocking of circuits in this manner maintains the carriage within the furnace until the load transferring operations have been completed.

As soon as the lever motor 31 has raised the charging fork 15 to its upper position, the limit switch LSA is operated to open its contacts 288, 307 and 308, while its contacts 309 and 310 are closed. The opening of its contacts 288 deenergizes the up-direction switch 285, which switch is operated to deenergize the motor 31.

The closing of the contacts 309 of the limit switch LSA serves to complete an energizing circuit for the raise direction switch 312 of the side door motor 60. This circuit may be traced from the supply line 152 by conductor 313, contacts 314 provided on the side door limit switch LSB1, contacts 309 of limit switch LSA, conductor 315, operating coil 316 of direction switch 312, interlock contacts 317 of the lowering direction switch 279 and by conductors 318, 165 and 159 to the other supply line 153. The direction switch 312 thereupon closes to connect the armature of the motor 60 by conductors 319 and 320 to a suitable source of direct current supply designated by the positive and negative symbols. The motor 60 is provided with a separately excited field winding 321 which is energized from a suitable source of direct current supply as indicated. The motor 60 is therefore caused to rotate in a direction to raise the side door.

As soon as the side door reaches its upper position the track type limit switch LSB1 is operated to open its contacts 314 and to close its contacts 322. The opening of the former contacts deenergizes the direction switch 312 which in turn deenergizes the motor 60. The contacts 322 of the limit switch LSB1 serve to complete the energizing circuit for the in-direction switch 182 of the carriage motor 37. This circuit may be traced from the supply line 152, by conductor 323, contacts 322, of LSB1 conductor 324, contacts 305 of the sequence relay L6, conductor 325, contacts 326 of the carriage limit switch LSC, conductor 327, operating coil of the direction switch 182, interlock contacts 328 of the out-direction switch 180, and by conductor 185 to the other supply line 153. The direction switch 182 is thereupon closed to energize the carriage motor 37 to cause it to be rotated in a direction to move the carriage and the charging fork 15 towards the preheat chamber 39. A separately excited field winding 330 is provided on the carriage motor 37 to provide excitation therefor.

It will be remembered that the energizing circuit for the accelerating relay 127 of the carriage motor was traced through the contacts 181 on the in-direction switch 182. Therefore, as soon as the direction switch was operated this circuit was broken by the opening of the contacts 181. After a predetermined time interval introduced by reason of the short circuited coil 127A its contacts are closed to establish an energizing circuit for the accelerating contactor 331. This circuit may be traced from the supply line 152 by conductors 174, 176, 177, contacts of the accelerating relay 127, operating coil of the accelerating contactor 331 and by conductors 333 and 185 to the other supply line 153. The accelerating contactor 331 is therefore operated to its closed position to short circuit the resistance 334 connected in series with the armature of the motor 37.

While I have only shown a single accelerating contactor for the carriage motor 37, it will be understood that several accelerating contactors may be used to provide smooth acceleration of the carriage motor. However, as I have indicated in connection with the lever motor 31, the accelerating contactors have been omitted for the purpose of simplifying the drawings wherever the function of these contactors are well known and well understood by those skilled in the art.

As the carriage 40 nears its limit of movement with the charging fork 15 and the load 12 within the preheat chamber, the limit switch LSC is operated to open its contacts 326 and 336 and to close its contacts 337 and 338. It will be observed that the operating coil of the direction switch 182 is deenergized due to the opening of the contacts 326 of the limit switch LSC. As this direction switch is operated to its open position its contacts 339 are closed to establish a dynamic braking circuit for the carriage motor 37 through a resistance 340. This circuit may be traced from one side of armature of the carriage motor 37 by contacts 339 operated with the direction switch 182 dynamic braking resistance 340, contacts 341, operated with the direction switch 180, and by conductor 342 to the other side of the armature of the motor 37.

The positions of the carriage 40 and the charging fork 15 as they come to a standstill are shown in Fig. 7.

The closing of the contacts 337 of the limit switch LSC serves to establish an energizing circuit for the lower-direction switch 282 of the lever motor 31. This circuit may be traced from the supply line 152, by conductor 346, contacts 310 of the limit switch LSA (which contacts it will be remembered were closed when the charging fork 15 was raised by the lever motor 31) interlock contacts 348 of the direction switch 285, operating coil of the lower-direction switch 282, conductor 350, contacts 337 of the limit switch LSC, and by conductors 351 and 159 to the other supply line 153. The motor 31 is thereupon caused to be rotated in a direction to lower the charging fork 15 thereby depositing the load 12 on the roll table and the load 13 on the stationary rails 11.

Incident to the closing of the lower direction switch 282 an energizing circuit for the trip coil 352 of the sequence relay L1 is completed by the closing of the contacts 353 operated by the lower-direction switch 282. This circuit may be traced from supply line 152 by conductor 354, trip coil 352 of the sequence relay L1, contacts 353 of the lower-direction switch 282, and by conductors 355 and 159 to the other supply line 153. Similarly, the contacts 356 operated with this direction switch were closed to complete an energizing circuit for the trip coil 357 of the sequence relay L6. This circuit may be traced from the supply line 152, conductor 358, contacts 356, of direction switch 282, conductor 359, trip coil 357 and by conductors 304 and 159 to the other supply line 153. It will be remembered that the sequence relay L6 was operated to its latched-in position so that the in-direction switch 182 of the carriage motor could be energized, and so that the energizing circuit of the out-direction switch 180 could not be completed. Therefore, it will be seen that as soon as the trip coil 357 releases the sequence relay L6 this relay is operated to its unlatched position to close its contacts 306, thereby partially completing an energizing circuit for the out-direction switch 180 of the carriage motor 37.

As the charging fork 15 is lowered, the contacts 309 and 310 of the lever limit switch LSA are operated to their open positions, while the contacts 288, 307 and 308 of the cam limit switch LSA are operated to their closed positions. The opening of the contacts 310 serves to deenergize the lower-direction switch 282, which switch is operated to its open position to deenergize the lever motor 31. At the same time the contacts 308 of the limit switch LSA complete the energizing circuit for the out-direction switch 180 of the carriage motor 37. This circuit may be traced from the supply line 152 by conductor 361, contacts 308 of the limit switch LSA, conductor 362, contacts 306 of the sequence relay L6, conductor 364, contacts 338 of the limit switch LSC, conductor 366, operating coil of the out-direction switch 180, interlock contacts 368 of the in-direction switch 182, and by conductor 185 to the other supply line 153. The out-direction switch 180 is thereupon closed to energize the motor 37 in a direction to drive the carriage 40 and the charging fork 15 from the preheat chamber. As before, the accelerating relay 127 closes after a predetermined interval of time to energize the accelerating contactor 331. In this case the circuit to the accelerating relay 127 is broken by reason of the opening of the contacts 179, operated with the out-direction switch 180.

As the carriage is driven to its outer position as shown in Fig. 6, the contacts 337 and 338 of the carriage limit switch LSC are operated to their open positions while the contacts 326 and 336 of this switch are operated to their closed positions. The out-direction switch 180 is deenergized and operated to its open position as a result of the opening of the contacts 338 of the limit switch LSC. As this switch is operated to its open position the contacts 341 operated with it are closed to establish a dynamic braking circuit for the carriage motor 37 so that the motor is quickly braked to a standstill with the carriage and the charging fork in their original positions.

Incident to the closing of the contacts 336 of the carriage limit switch LSC the lower-direction switch 279 of the side door motor 60 is closed by reason of an energizing circuit which may be traced from the supply line 152 by conductor 372, contacts 373 of the limit switch LSB2, contacts 307 of the limit switch LSA, conductor 375, interlock contacts 376 of the direction switch 312, operating coil of the direction switch 279, conductor 377, contacts 336 of the limit switch LSC, and by conductors 378, 351 and 159 to the other supply line 153. As a result of the closing of the direction switch 279, the motor 60 is energized in a direction to lower the side door 50.

Inasmuch as the carriage 40 and the charging fork 15 have been driven from the preheat chamber and the side door is being lowered, the roll motor may now be energized in a manner to cause the oscillation of the charge in the preheat chamber 39. The sequence relay L3, controlling the energization of the roll motor 65, is therefore closed as soon as the side door motor direction switch 279 is operated to its closed position by reason of an energizing circuit completed by the closing of the contacts 380 operated with this direction switch. This circuit may be traced from the supply line 152 by conductors 381, operating coil 382 of the sequence relay L3, conductor 384, contacts 380 of the direction switch 279 and by conductors 385, 165 and 159 to the other supply line 153.

The sequence relay L3 is thereupon operated to its latched-in position with its contacts 387 closed and its contacts 167 open.

As soon as the side door 50 reaches its lower limit, the contacts 373 of the side door limit switch LSB2 are operated to their open position to deenergize the direction switch 279. At the same time the contacts 287 of this limit switch are closed.

As soon as the sequence relay L3 was latched into position the armature of the roll motor 65 is shunted by a resistance 390 while the energizing circuit to the accelerating contactors 395 and 396 are interrupted so that the series resistances 397, 398 and 400 remain effective. Consequently, the motor 65 may only rotate at a very low speed to change progressively the load supporting area of each roller. The opening of the contacts 167 of the sequence relay L3 accomplishes the interruption of the energizing circuits to the accelerating contactors. The shunt connection of the armature of motor 65 with the resistance 390 is accomplished by reason of the completion of an energizing circuit for the contactor 401. This circuit may be traced from the supply line 152 by conductor 402, contacts 387 of the sequence relay L3, conductor 403, operating coil of the contactor 401 and by conductors 404, 165 and 159 to the other supply line 153. As soon as the contactor 401 is closed, an energizing circuit is completed for the clutch operating coil 415 due to the closing of the contacts 414 operated with the contactor 401. This circuit may be traced from the supply line 152 by conductor 416, clutch operating coil 415, conductor 417, contacts 414 of the contactor 401, and by conductors 418, 165 and 159 to the other supply line 153. The solenoid 415 thereupon operates the clutch member 419 into engagement with a cooperating clutch member 420 thereby establishing a mechanical connection between the driving motor 65 and the limit switch LSK. The forward direction switch 169 of the roll motor 65 is operated to its closed position as a result of the closing of the contacts 387 of the sequence relay L3. This energizing circuit may be traced from the supply line 152 by conductor 402, contacts 387 of the sequence relay L3, conductor 422, contacts of the time closing relay TF, conductor 424, contacts 425 of the push button station 426, conductor 427, contacts 428 of the limit switch LSK, contacts 262 of the relay 201, contacts 271 of the relay 272, operating coil 430 of the forward direction switch 169, interlock contacts 431 of the reverse direction switch 432 of the roll motor 65, and by conductors 433, 165 and 159 to the other supply line 153. The direction switch 169 thereupon closes to energize the motor 65 so that it drives the rollers in a forward direction. A separately excited field winding 434 provides excitation for this motor. It will be observed that this field winding 434 is connected in series with a resistance 435. A relay 436 has its operating coil connected across the series resistances 397, 398, and 400. As soon as current flows to the armature of the motor 65 the resulting potential difference existing across the series resistances 397, 398 and 400 is sufficient to cause the operating coil of the relay 436 to close its contacts, thereby short circuiting the field resistance 435. The result is an increase in field current and a consequent reduction in the speed of rotation of the motor 65.

As soon as the motor 65 has driven the rollers through approximately 190 degrees, the contacts 428 of the limit switch LSK are operated to their open position, thereby deenergizing the direction switch 169. At the same time, the contacts 163 of the limit switch LSK are operated to their open position, while the contacts 438 and 439 are operated to their closed positions.

The closing of the contacts 439 of the limit switch LSK serves partially to complete an energizing circuit for the reverse direction switch 432 of the roll motor 65.

It will be remembered that the energizing circuit for the timing relay TR was traced through the contacts 163 of the limit switch LSK. Therefore, as soon as these contacts were operated to their open position, they served to interrupt this energizing circuit. After a predetermined interval of time the contacts of the time closing relay TR are closed to complete the energizing circuit for the reverse direction switch 432 of the roll motor. This circuit may be traced from the supply line 152 by conductor 402, contacts 387 of the sequence relay L3, conductor 422, contacts of the timing relay TR, contacts 439 of the limit switch LSK, conductor 440, interlock contacts 442 of the direction switch 169, operating coil 443 of the direction switch 432, and by conductors 444, 165 and 159 to the other supply line 153.

The direction switch 432 is thereby closed to energize the roll motor 65 for reverse direction of rotation. The field relay 436 again closes to short circuit the field resistance 435 so that the speed of the motor is very low.

The closing of the contacts 438 of the limit switch LSK serves to complete an energizing circuit for the time closing relay TF. This circuit may be traced from the supply line 152 by conductor 162, operating coil of the relay TF, conductor 446, contacts 438 of the limit switch LSK, and by conductors 447, 164, 165 and 159 to the other supply line 153. The timing relay TF is thereupon operated to open its contacts. These timing relays TF and TR serve to introduce the time interval between the successive operations of the roller motor 65.

As soon as the rollers have been rotated through some 190 degrees, or to their original positions, the limit switch LSK again functions to open its contacts 438 and 439, while closing the contacts 163 and 428. The opening of the contacts 439 deenergizes the direction switch 432, which switch is operated to its open position to deenergize the roll motor 65. The opening of the contacts 438 of the limit switch LSK deenergizes the operating coil of the timing relay TF, which relay after a predetermined time interval, operates to close its contacts. The direction switch 169 is thereby energized by means of the circuit traced above and the motor 65 again rotates in the forward direction at very low speed. The closing of the contacts 163 of the limit switch LSK serves to again complete the energizing circuit for the timing relay TR, which is immediately operated to open its contacts so that it is in readiness for the next operation of the roll motor.

The described cycle of operations serves constantly to shift the work back and forth in the preheat chamber. The result is the uniform heating of the material as well as the prevention of the deformation of the rollers or the work due to uneven heating. It is to be understood that the rollers may be rotated through 180° or more. If the rollers were rotated through 360° first in one direction and then in the other direction, it would not be necessary to introduce the time interval between reversals; that is to say for a 360° cycle the load supported by the rollers is equally distributed over the entire surface of the rollers. However, by rotating the rollers through more than 180° but less than 360° and by introducing a time interval between reversals roller bending and/or deformation may be substantially if not entirely eliminated. An economy in furnace size is also attained by decreasing the roller travel to less than 360°.

The contacts 450 and 451 of the limit switch LSK are arranged to be operated to their closed positions as soon as roll motor 65 has rotated through a given angle in a forward direction. Thereafter they are immediately operated to their open positions so that the contacts 450 and 451 remain closed only for a short interval of time as the motor 65 is rotated in a forward direction. These limit switch contacts have for their function the partial completion of energizing circuits for producing at the proper time the high speed operation of the motor 65. In other words the transfer of work from one heating chamber to another may only be initiated with the rollers occupying a predetermined position.

After the load 12 of steel bars has been oscillated in the preheat chamber for a period of time as determined by the setting of the master timer 132, the master timer times out thereby closing its contacts 133. It will be assumed that these contacts are closed just as the roller position determining contacts 450 and 451 of the limit switch LSK are closed. The raise-direction switch 452 of the end doors is immediately closed by reason of the completion of an energizing circuit which may be traced from the supply line 152, by conductor 454, contacts 451 of the limit switch LSK, conductor 455, contacts 133 of the master timer 132, conductor 456, contacts 457 of the end door limit switch LSD, conductor 458, operating coil 459 of the raise direction switch 452, interlock contacts 460 of the lower direction switch 281, and by conductors 223 and 185 to the other supply line 153. The motor 71 is immediately energized in a direction to raise the end doors 70, 73 and 74. The excitation for the motor 71 is provided by a separately excited field winding 461. The closing of the contacts 462 operated with the direction switch 452 serves to complete an energizing circuit for the trip coil 465 of the sequence relay L3. This circuit may be traced from the supply line 152 by conductor 466, contacts 450 of the limit switch LSK, trip coil 465 of the sequence relay L3, conductors 467 and 468, contacts 462 of direction switch 452 and by conductors 469, 164, 165 and 159 to the other supply line 153. The sequence relay L3 is thereupon operated to its unlatched position with its contacts 167 closed and its contacts 387 open. The opening of the contacts 387 interrupts the energizing circuit of the contactor 401 which is immediately operated to its open position. The opening of the contacts 414 operated with the contactor 401 serves to deenergize the clutch operating coil 415 of the limit switch LSK so that the clutch member 419 immediately disengages itself from the clutch member 420. The opening of the contacts 387, of the sequence relay L3 it will be remembered also serves to deenergize the forward direction switch 169 of the roll motor which switch immediately operates to its open position. As the direction switch 169 opens, the contacts 168 operated with this switch are closed to complete an energizing circuit for the accelerating relay 126. This circuit may be traced from the supply line 152 by conductor 166, contacts 167 of the sequence relay L3, contacts 168 of the direction switch 169, conductor 170, operating coil of the accelerating relay 126, and by conductors 171, 165 and 159 to the other supply line 153. The accelerating relay is thereupon operated to open its contacts so as to be in readiness for the high speed operation of the motor.

As soon as the end doors have been raised to their upper positions, the end door limit switch LSD operates to close its contacts 471, 473, 474 and to open its contacts 457, 475 and 244. The contacts 477 and 478 of this limit switch are arranged to be closed only as the end doors are being lowered. The opening of the contacts 457 interrupts the energizing circuit to the direction switch 452 which is immediately operated to its open position to deenergize the end door motor 71.

The closing of the contacts 473 of the end door limit switch LSD serves to complete an energizing circuit for the forward direction switch 169 of the roll motor 65. This circuit may be traced from the supply line 152 by conductor 454, contacts 451 of the limit switch LSK, contacts 473 of the limit switch LSD, conductor 480, contacts 262 of the relay 201, contacts 271 of the relay 272, conductor 482, operating coil 430 of the direction switch 169, interlock contacts 431 of the reverse direction switch 432, and by conductor 433, 165 and 159 to the other supply line 153. Consequent to the closing of this direction switch it will be observed that the roll motor 65 is again energized for rotation in the forward direction. The accelerating relays 481 and 485 are operated to their open positions by reason of the IR drop across the resistance 397. The opening of the contacts 168 operated with the direction switch 169 interrupted the energizing circuit traced above for the accelerating relay 126. This relay therefore time closes to complete an energizing circuit for the first accelerating contactor 395. This circuit may be traced from the supply line 152 by conductor 166, contacts 167 of the sequence relay L3, conductor 166A and 482, contacts of the accelerating relay 126, conductor 484, operating coil of the contactor 395, and by conductors 171, 165 and 159 to the other supply line 153. The closing of the contactor 395, it will be observed, short circuits the series resistance 397, and also short circuits the operating coil of the second accelerating relay 481, which coil, it will be observed, is connected directly across the resistance 397. The result is that the motor 65 is accelerated a predetermined amount. After a predetermined interval of time, the relay 481 closes its contacts to energize the second accelerating contactor 396. This circuit may be traced from the supply line 152 by conductor 166, contacts 167 of the sequence relay L3, conductor 166A and 482, contacts of the accelerating relay 126, conductor 484, contacts of the accelerating relay 481, operating coil of the accelerating contactor 396, and by conductors 165 and 159 to the other supply line 153. This contactor thereupon closes to short circuit the second accelerating resistance 398 from the armature circuit of the motor 65. Inasmuch as the accelerating relay 485 has its operating coil connected across the resistances 397 and 398, the closing of the second accelerating contactor short circuits the operating coil of the accelerating relay 485. After a predetermined interval of time this relay operates to close its contacts thereby completing an energizing circuit for the third accelerating contactor 488. This circuit may be traced from the supply line 152 by conductor 166, contacts 167 of the sequence relay L3, conductor 166A and 482, contacts of the accelerating relay 126, conductor 484, contacts of the accelerating relay 485, operating coil of the contactor 488, and by conductors 165 and 159 to the other supply line 153. The closing of the contactor 488 serves to short circuit the resistances 397, 398 and 400 so that the motor 65 is accelerated to substantially full speed. It will be remembered that the field accelerating relay 436 is connected across the series resistances 397, 398 and 400, so that as soon as the contactor 488 removes these resistances from the armature circuit of the motor 65, the operating coil of the field relay 436 is short circuited. The field relay thereupon opens its contacts to reinsert the resistances 435 in the circuit of the field winding of the motor 65, causing the acceleration of the motor to its full speed.

By thus providing for the rapid acceleration of the motor 65, the load 12 of steel bars is rapidly transferred from the preheat chamber 39 to the highheat chamber 52 so that the work is transferred from one chamber to the other chamber with a minimum loss of heat in the work itself. Furthermore, by interlocking the circuits as described, it will be observed that the end doors are open for a minimum length of time so that the inrush of cold air into the preheat and highheat chambers is minimized.

Inasmuch as the master timer 132 will be set for different periods of time corresponding to the size of the work and nature of the heat treatment, it will be apparent that the master timer will time out and that the contacts 133 will close under some conditions of operation when the roll motor 65 is oscillating the rolls in the reverse direction. Should the contacts 133 of the timer 132 close when the motor 65 is rotating in the reverse direction, it will be seen that the contacts 451 of the limit switch LSK will be in their open position, so that an energizing circuit may not be completed for the raise direction switch 452 of the end doors. The motor 65 will continue to operate the rolls for the reverse direction of rotation until the limit switch LSK is operated to reverse the direction of rotation. As soon as the roll motor 65 is operated through the predetermined angle in the forward direction, the contacts 450 and 451 of the limit switch LSK will be operated to their closed positions as before. The energizing circuit for the raise direction switch 452 of the end doors is thereby completed so that the end door motor 71 immediately operates to raise the end doors. The sequence relay L3 is immediately operated to its unlatched position by reason of the completion of the energizing circuit for its trip coil 465. The roll motor 65 is thereby deenergized; the contactor 401 is operated to its open position, while the accelerating relay 126 is energized preparatory for the high speed operation of the roll motor. The high speed operation of the motor 65 is accomplished by the completion of the circuits described above. It will be remember that the high speed operation is initiated by the closing of the end door limit switch contacts 473, which contacts complete an energizing circuit for the forward direction switch 169. It should again be observed that by interlocking the circuits as described, the end doors are not raised until the rollers and consequently the load of material, occupy a desired position in readiness for the high speed transfer of the work from the preheat chamber to the highheat chamber. Furthermore, this interlocking insures that the charges of work in each heating chamber will occupy the same relative positions with respect to their end doors for each successive change introduced into the preheat chamber.

Continuing with the operation, as the charge of work 12 approaching its final position in the highheat chamber, it will be remembered that the bumper switch B1 located at the end of the highheat chamber is in readiness for operation by the charge of work 12. As soon as the leading ends of the work 12 strike the operating lever 88 of this bumper switch, the switch is operated to close its contacts. An energizing circuit for the operating coil of the relay 272 is thereby completed. This circuit may be traced from the supply line 152, by conductor 490, contacts of the bumper switch B1, conductor 491, operating coil of the relay 272 and by conductor 185 to the other supply line 153. The relay 272 is operated to open its contacts 271 and to close its contacts 493 and 494. It will be observed that the opening of the contacts 271 immediately deenergizes the forward direction switch 169, which switch is operated to its open position. Inasmuch as the contacts 168 operated with the direction switch 169 are closed, as this switch opens, to energize the accelerating relay 126, it will be observed that the accelerating contactors 395, 396 and 488 are deenergized. The result is that the series resistances 397, 398 and 400 are connected in series with the armature circuit of the motor 65. Coincident with the closing of the contacts 168, the contacts 495 also operated with the direction switch 167 are closed to connect the operating coil 496 of the contactor 497 directly across the armature of the motor 65 and the series resistances 397, 398 and 400. It will be remembered that the motor field winding 434 is separately excited so that as soon as the direction switch operates to deenergize the armature of the motor 65, the motor begins to act as a generator and the resulting electromotive force applied to the operating coil 496 of the contactor 497 causes this contactor to be operated to its closed position. A dynamic braking circuit is thereby established through the resistance 498. The rate of deceleration as determined by the dynamic braking is further increased by reason of the closing of the field relay 436, which it will be observed will have voltage applied to it, due to the potential difference existing across the series resistances 397, 398 and 400. The motor 65 is thereby quickly brought to a standstill with the load 12 of steel bars at rest within the highheat chamber 52.

The next step in the sequence of operation is to close the end doors. This is accomplished by the closing of the contacts 493 of the relay 272 which serves to complete the energizing circuit for the lowering direction switch 281 of the end door motor 71. This circuit may be traced from the supply line 152 by conductors 501 and 502, contacts 493 of the relay 272, contacts 280 of the relay 274, conductor 503, contacts 474 of the limit switch LSD, conductor 505, contacts 506 of the bumper switch B2, conductor 507, interlock contacts 508 of the direction switch 452, operating coil 509 of the lowering direction switch 281 and by conductors 223 and 185 to the other supply line 153. The direction switch 281 is thereupon closed to energize the motor 71 in a direction to lower the end doors.

To insure the continuance of the desired cycle of operations should there be a power failure at this point in the operation of the furnace, the sequence relay L4 is operated and latched into position, due to the closing of the contacts 517 operated with the direction switch 281. The energizing circuit thereby completed may be traced from the supply line 152 by conductor 515, operating coil of the sequence relay L4, conductor 516, contacts 517, operated with the direction switch 281, and by conductors 223 and 185 to the other supply line 153. With the sequence relay L4 in its latched-in position, it will be seen that its contacts 514 are closed to establish a shunt connection around the contacts 493 of the relay 272 and the contacts 280 of the relay 274.

As soon as the end doors are lowered the end door limit switch LSD operates to open its contacts 471, 473 and 474, while its contacts 244, 457 and 475 are closed. The closing of the contacts 475 energizes the trip coil 520 of the sequence relay L4 through a circuit which may be traced from the supply line 152 by conductor 515, trip coil 520, contacts 475 of the limit switch LSD, and by conductors 521, 223 and 185 to the other supply line 153. The opening of the contacts 474 of the limit switch LSD interrupts the energizing circuit to the lowering direction switch 281 which immediately operates to its open position thereby deenergizing the end-door motor 71. The closing of the contacts 244 of LSD completes the energizing circuit for the master timer 132 which timer begins a new timing operation.

The contacts 477 and 478 of the end door limit switch LSD are so arranged that both of these contacts are closed only as the end doors are lowered to their lower limit. The function of the contacts 477 and 478 is, therefore, to give an indication that the end doors have been hoisted to their upper positions and are on their way down to their lower limit position. At this point in the cycle with both contacts closed, an energizing circuit for the trip coil 527 of the sequence relay L5 may be traced from the supply line 152 by conductor 528, contacts 477 of the limit switch LSD, contacts 478 of the limit switch LSD, trip coil 527, and by conductors 529, 165 and 159 to the other supply line 153. The sequence relay L5 is thereupon operated to open its contacts 273 and to close its contacts 270. The opening of the former contact serves to deenergize the relay 274 which is thereupon operated to open its contacts 278 and 280. The closing of the contacts 270 serves partially to complete an energizing circuit for the forward direction switch 169. It will be observed that the contacts 270 are connected so as to by-pass the contacts 271 of the relay 272, which relay will remain energized by reason of the energizing circuit completed for its operating coil by the bumper switch B1.

It will be remembered that this bumper switch was operated by the arrival of the charge 12 of steel bars within the high heat chamber and the closing of its contacts causes the energization of the relay 272. When this relay was operated an indication was obtained that the charge of work had been entirely transferred from the preheat chamber 39 to the highheat chamber 52. A circuit was thereby established for the up-direction switch 285 of the lever motor 31 by the closing of the contacts 494 of the relay 272, so that the sequence described above for placing a charge of work in the preheat chamber is again initiated. The energizing circuit for the up-direction switch 285 may be traced from the supply line 152, by contacts 286 of the bumper switch B2, contacts 287 of the side door limit switch LSB2, contacts 288 of the cam limit switch LSA, conductors 530 and 531, contacts 278 of the relay 274, contacts 494 of the relay 272, and by conductors 532, and 533, operating coil 289 of the direction switch 285, interlock contacts 291 of the direction switch 282, and by conductors 293 and 159 to the other supply line 153. The direction switch 285 is thereupon operated to its closed position to energize the lever motor 31 in a direction to raise the charging fork 15. The closing of the contacts 534 operated with the direction switch 285 serves to complete an energizing circuit for the sequence relay L1, which circuit may be traced from the supply line 152 by conductor 354, contacts 534, conductor 535, operating coil of the sequence relay L1 and by conductors 283 and 159 to the other supply line 153. The sequence relay L1 is thereupon latched into position with its contacts 284 closed to complete a holding circuit for the up-direction switch 285. This circuit may be traced from the supply line 152, by contacts 286 of the bumper switch B2, contacts 287 of the side door limit switch LSB2, contacts 288 of the limit switch LSA, contacts 284 of the sequence relay L1, operating coil 289 of the direction switch 285, interlock contacts 291, and by conductors 293 and 159 to the other supply line 153. It will therefore be observed that the function of the sequence relay L1 for this part of the sequence of operation is to prevent interruption of the energizing circuit for the direction switch 285 in case of power failure, and also to insure that the lever motor 31 is energized a sufficient length of time to raise the charging fork 15. This provision is necessary, inasmuch as it will be remembered that as soon as the sequence relay L5 is operated to its unlatched position with its contacts 273 open the relay 274 is deenergized. The contacts 278 of the relay 274, it will be remembered, form a part of the energizing circuit which initiated the operation of the up-direction switch 285.

The closing of the contacts 299 operated with the up-direction switch 285 serves to complete an energizing circuit for the sequence relay L6 in the same manner as described in the initial operation of the up-direction switch. The sequence relay L6 is thereupon operated to its latched-in position, partially completing by means of the contacts 305 the energizing circuit for the in-direction switch 182 of the carriage motor. As soon as the motor 31 has raised the levers to their upper position in readiness for the placing of the charge 13 of steel bars into the preheat chamber 39, the contacts 288 of the limit switch LSA are operated to their open position to deenergize the direction switch 285 which in turn deenergizes the motor 31. At the same time the contacts 309 and 310 of the limit switch LSA are operated to their closed positions, while the contacts 307 and 308 are operated to their open positions. The functions of the limit switch contacts 309 is the same as described above and serves to complete the energizing circuit for the direction switch 312 of the side door motor. This direction switch, thereupon closes to energize the motor 60 in a direction to raise the side door. As soon as the side door is hoisted to its upper position the contacts 314 of the track limit switch LSB1 are operated to their open position to deenergize the direction switch 312 which in turn deenergizes the side motor 60. At the same time the contacts 322 of the limit switch LSB1 are operated to their closed position to complete an energizing circuit for the direction switch 182 for the carriage motor 37. The carriage motor 37 is thereby energized in a direction to move the charging fork 15 and the carriage 40 towards the preheat chamber. The accelerating relay 127 again functions to energize the accelerating contactor 331 so that the motor is accelerated as described above. As the charging fork and carriage approach the limit of their travel the carriage limit switch LSC operates to close its contacts 337 and 338 while its contacts 326 and 336 are operated to their open positions. The opening of the contacts 326, it will be observed, deenergizes the direction switch 182. The closing of the contacts 337 of the limit switch LSC completes the energizing circuit for the down-direction switch 282 of the lever motor 31. As before, when this direction switch is closed, the contacts 356 operated with it are closed to complete an energizing circuit for the trip coil 357 of the sequence relay L6, which relay is thereupon operated to its unlatched position, with its contacts 306 closed partially to complete an energizing circuit for the out-direction switch 180 of the carriage motor 37.

It will be observed that the contacts 353 operated with the lever motor direction switch 282 are closed to complete an energizing circuit for the trip coil 352 of the sequence relay L1. This circuit may be traced from the supply line 152 by conductor 354, trip coil 352, contacts 353 of the direction switch 282, and by conductors 355 and 159 to the other supply line 153. The sequence relay L1 is thereupon operated to its unlatched position.

As the lever motor 31 lowers the charging fork 15 it will be observed that the charge 13 of steel bars is placed upon the roll table within the preheat chamber, while the third charge of steel bars which (it will be assumed) has been placed on the charging fork is transferred to the forward position which was formerly occupied by the charge 12. As the charging fork reaches its lower position the lever limit switch LSA again functions to close its contacts 288, 307 and 308, while its contacts 309, 310 are opened. The opening of the contacts 310 of the limit switch LSA serves to deenergize the down direction switch 282 of the lever motor. The closing of the contacts 308 of the limit switch LSA completes an energizing circuit for the out-direction switch 180 of the carriage motor 37, as has been described above. The motor 37 thereupon functions to drive the carriage and the charging fork from the preheat chamber. As the carriage approaches its outer limit of travel, the carriage limit switch LSC operates to open its contacts 337 and 338, and to close its contacts 326 and 336. The opening of the contacts 338 interrupts the energizing circuit to the direction switch 180 which is thereupon operated to its open position to deenergize the carriage motor 37 and to establish a dynamic braking circuit through the braking resistor 340 so that the carriage is quickly brought to a standstill.

The closing of the contacts 336 of the limit switch LSC completes an energizing circuit for the lowering direction switch 279 of the side door motor 60. This motor is thereupon energized in a direction to lower the side door. The contacts 380 operated with this switch are closed to complete an energizing circuit for the sequence relay L3. This sequence relay is thereupon operated and latched into its closed position with its contacts 387 closed and its contacts 167 open. As soon as the side door 50 reaches its lower position the track limit switch LSB2 operates to close its contacts 287 and to open its contacts 373, the latter of which serves to deenergize the lower-direction switch 279.

Inasmuch as the oscillation of the rollers is next in order it will be seen that the closing of the contacts 387 of the sequence relay L3 serves to complete an energizing circuit for the contactor 401 which contactor is thereby operated to its closed position to establish the shunt connection through the resistance 390 for the armature of the motor 65. The contacts 414 operated with the contactor 401 are closed to complete the energizing circuit for the clutch operating coil 415. The clutch is thereupon operated to connect the limit switch LSK with the roll motor 65. A circuit is also completed by reason of the closing of the contacts 387 of the sequence relay L3 for the forward direction switch 169 of the roll motor. This circuit may be traced from the supply line 152 by conductor 402, contacts 387 of the sequence relay L3, conductor 422, contacts of the timing relay TF, conductor 424, contacts 425 of the pushbutton station 426, conductor 427, contacts 428 of the limit switch LSK, contacts 262 of the relay 201, contacts 270 of the sequence relay L5, conductor 482, operating coil 430 of the direction switch 169, interlocking contacts 431 of the direction switch 432, and by conductors 433, 165 and 159 to the other supply line 153.

As described above, the opening of the contacts 167 of the sequence relay L3 serves to deenergize the accelerating contactors 395, 396 and 488, so that when the direction switch 169 is closed to energize the roll motor 65, the motor functions to drive the rolls at very low speed. As before, the field accelerating relay 436 operates to short circuit the field resistance 435 to further insure low speed operation of the roll motor 65.

The limit switch LSK thereafter functions to control the energization of the roll motor in conjunction with the timing relays TF and TR so that the charge 12 in the high heat chamber and charge 13 now in the preheat chamber are reciprocated to and fro for the reasons and purposes that I have already explained.

It will be remembered that as soon as the contacts 244 of the end door limit switch LSD were closed, the master timer 132 was again set into operation. At the expiration of the time interval, however, the master timer 132 again times out to close its contacts 133. The roller motor 65, however, continues the reciprocation of the work in the heating chamber until the predetermined point in the forward direction of rotation is reached at which point the contacts 450 and 451 of the limit switch LSK are operated to their closed positions. When this occurs, it will be observed that the contacts 451 serve to complete an energizing circuit for the raise direction switch 452 of the end doors, this circuit being traced as before from the supply line 152 by conductor 454, contacts 451 of the limit switch LSK, conductor 455, contacts 133 of the master timer, conductor 456, contacts 457 of the end door limit switch LSD, conductor 458, operating coil 459 of the raise direction switch 452, interlock contacts 460 of the lower direction switch 281 and by conductors 223 and 185 to the other supply line 152. Consequent to the closing of the raise direction switch 452, the end door motor 71 is energized in a direction to raise the end doors.

The closing of the contacts 462 operated with the direction switch 452 again serves to complete an energizing circuit for the trip coil 465 of the sequence relay L3, this circuit as before being dependent upon the closing of the contacts 450 of the limit switch LSK and the closing of the contacts 462 of the direction switch 452. The sequence relay L3 is thereupon operated to its unlatched position with its contacts 387 open and its contacts 167 closed. The former contacts as before, serve to deenergize the contactor 401 which is operated to its open position, while the contacts 414 operated with this contactor are opened to deenergize the clutch operating coil 415. The opening of these contacts, it will be remembered, also serves to deenergize the direction switch 169 which immediately operates to its open position thereby closing its contacts 168 operated with this switch. The circuit partially completed by the contacts 167 of the sequence relay L3 for the accelerating relay 126, is thereby completed and the relay 126 is operated to open its contacts.

Consequent to the arrival of the end doors in their upper positions, the end door limit switch LSD operates to close its contacts 471, 473 and 474, while its contacts 244, 457 and 475 are operated to their open positions. The opening of the contacts 457 deenergizes the raise direction switch 452 of the end door motor 71, while the closing of the contacts 473 serves to complete an energizing circuit for the forward switch 169 of the roll motor. This circuit may be traced from the supply line 152, by conductor 454, contacts 451 of the limit switch LSK, contacts 473 of the end door limit switch LSD, conductor 480, contacts 262 of the relay 201, contacts 270 of the sequence relay L5, conductor 482, operating coil 430 of the direction switch 169, interlock contacts 431 of the direction switch 432, and by conductors 433, 165 and 159 to the other supply line 153. Following the closing of the direction switch 169 the roll motor 65 is accelerated to its full speed in the manner described above when the charge 12 was transferred from the preheat chamber to the high heat chamber. The rotation of the motor 65 in the forward direction now serves to transport the charge 12 of steel bars to the run-out table, while the charge 13 is transferred to the high heat chamber.

As the leading end of the steel bars 12 passes through the end door 74 of the high heat chamber, the bumper switch B2 will be operated to open its contacts 286 and 506. The opening of the contacts 286, it will be observed, interrupts the supply circuit to the crane hoisting motor 104, normally traced by the conductor 540, in order that the crane may not be operated while the work is on its way from the high heat chamber to the run-out table. The opening of these contacts also interrupts the energizing circuit for the up direction switch 285 of the lever motor so that the levers may not be operated while the charge of steel bars in the preheat chamber is being transported to the high heat chamber. The opening of the contacts 506 of the bumper switch B2 serves to interrupt the lowering circuit of the direction switch 281 of the end doors so that the end doors may not be lowered until the work has been entirely transported from its former position to its new position, that is to say, until the charge 12 has been transferred to the run-out table while the charge 13 has been transferred to the high heat chamber. As soon as the trailing ends of the steel bars 12 leave the operating lever of the bumper switch B2, this limit switch is again operated to close its contacts 286 and 506.

It will be remembered that the bumper switch B3 located at the end of the run-out table is arranged to be operated by the leading ends of the work as it arrives in position on the run-out table. As soon as the leading ends of the work arrive in position the contacts of the bumper switch B3 are thereby closed to complete an energizing circuit for the operating coil of the relay 201. This circuit may be traced from the supply line 152 by conductor 541, contacts of the bumper switch B3, conductor 542, operating coil of the relay 201, and by conductors 543 and 185 to the other supply line 153. The relay 201 thereupon operates to open its contacts 200 and 262 and to close its contacts 544, 546 and 547, the opening of the contacts 262 serves to interrupt the energizing circuit to the direction switch 169. As explained above, the opening of the direction switch 169 serves to complete an energizing circuit by means of its contacts 168 for the accelerating relay 126, which relay operates to open its contacts so that the accelerating contactors 395, 396 and 488 are deenergized and operated to their open position to re-insert the series resistances 397, 398 and 400 in the armature circuit of the motor 65. The contactor 497 is operated to its closed position by reason of the potential difference existing across the armature and the series resistances 397, 398 and 400 of the motor 65. A dynamic braking circuit through the resistor 498 is thereby established and the motor 65 will be braked to a standstill. The field relay 436 again functions to increase the excitation produced by the field winding 434 on the motor 65 thereby increasing the dynamic braking effort of the motor 65.

The closing of the contacts 546 of the relay 201 serves to complete an energizing circuit for the up-direction switch 285 of the lever motor. This circuit may be traced from the supply line 152 by contacts 286 of the bumper switch B2, contacts 287 of the side door limit switch LSB2, contacts 288 of the limit switch LSA conductor 530, contact 546 of the relay 201, conductor 533, operating coil 289 of the up-direction switch 285, interlock contacts 291 of the direction switch 282, and by conductors 293 and 159 to the other supply line 153. The up-direction switch 285 is thereby closed to energize the motor 31 in a direction to raise the charging fork 15. The closing of the contacts 534 operated with the direction switch 285 again serves to complete an energizing circuit for the sequence relay L1. This relay is operated to its latched in position with its contacts 284 closed to maintain the energizing circuit for the up-direction switch 285 until this direction switch is deenergized by the opening of the contacts 288 of the lever limit switch LSA. The closing of the contacts 299 operated with the direction switch 285 again serves to complete an energizing circuit for the sequence relay L6 which is operated to its latched in position partially to complete an energizing circuit for the in-direction switch 182 of the carriage motor 37. The contacts 309 of the lever limit switch LSA are again closed as soon as the charging fork 15 has been raised to its upper position to complete an energizing circuit for the raise-direction switch 312 of the side door motor 60. The energizing circuits described and traced above are again completed so that the side door is raised to its upper position, the carriage is moved towards the preheat chamber until the charging fork 15 is in a position to deposit the next load within the preheat chamber. The levers are operated to lower the charging fork, the sequence relays L1 and L6 are tripped and operated to their unlatched positions. The carriage motor 37 is energized to drive the carriage from the preheat chamber, while the side door motor 60 is again energized to lower the side door.

Consequent to the closing of the relay 201 an energizing circuit was completed through its contacts 547 for the lowering direction switch 281 of the end door motor 71. This circuit may be traced from the supply line 152 by conductor 501, contacts 547 of the relay 201, contacts 474 of the end door limit switch LSD, conductor 505, contacts 506 of the bumper switch B2, conductor 507, interlock contacts 508 of the raise direction switch 452, operating coil 509 of the lower direction switch 281, and by conductors 223 and 185 to the other supply line 153.

It will therefore be observed that the end doors are lowered just as soon as the steel bars have arrived in position on the run-out table. In each case the provision is made so that the end doors are lowered at the same time that the side door is being raised. This interlocking of the circuit serves to minimize the loss of heat due to the hoisting of the side door and of the end doors. For example if both the side door 50 and the end door 70 of the preheat chamber were in their full open positions at the same time, it will be seen that a substantial loss of heat might take place due to a draft which might result through the preheat chamber 39.

The opening of the contacts 200 and the closing of the contacts 544 of the relay 201 initiate the operation of the hoisting motor 104 so that the load 12 which has arrived on the run-out table is immediately transported to the quenching tank. It will be remembered that the energizing circuit for the accelerating contactors 198 and 209 of the hoisting motor 104 were traced through the contacts 200 of the relay 201. Therefore, as soon as the relay 201 operates to open its contacts 200 the contactors 198 and 209 were operated to their open positions, due to the interruption of their energizing circuits.

The closing of the contacts 544 of the relay 201 serves to complete an energizing circuit for sequence relay L7. This circuit may be traced from the supply line 152 by conductor 199, contacts 544 of the relay 201, conductor 545, operating coil 548 of the sequence relay L7, and by conductors 304 and 159 to the other supply line 153. The sequence relay L7 is thereupon operated to its latched-in position with its contacts 555 closed to complete an energizing circuit for the hoisting relay 190. This circuit may be traced from the supply line 152 by contacts 286 of the bumper switch B2, conductor 540, contacts 555 of the sequence relay L7, contacts of the track type limit switch LSH2, conductor 558, contacts 559 of the limit switch LST operated by the trolley motor 105, conductor 560, interlock contacts 562 of the lowering relay 193, operating coil 563 of the hoisting relay 190, and by conductor 565 to the other supply line 153. The hoisting relay 190 is thereupon operated to open its contacts 203 and 189 while it closes its contacts 566, 567, 568 and 570. The opening of the contacts 203 serves to prevent the subsequent energization of the accelerating contactors 198 and 209 through the circuit completed by the contacts 200 of the relay 201. The opening of the contacts 189 of the hoisting relay serves to deenergize the field accelerating contactor 187, which contactor is thereby operated to its open position. The closing of the contacts 567 of the hoisting relay 190 serves to complete an energizing circuit for the field accelerating contactor 212. This circuit may be traced from the supply line 152 by conductors 174, 176 and 214, contacts 567 of the hoisting relay 190, conductor 572, operating coil 216 of the contactor 212, and by conductor 217 to the other supply line 153. The closing of the contacts 566 of the hoisting relay 190 completes the energizing circuit of the time closing relay TR2. This circuit may be traced from the supply line 152, by conductors 174, 176, 698 contacts 566 of the hoisting relay, operating coil of the relay TR2 and by conductor 565 to the other supply line 153.

The closing of the contacts 570 of the hoisting relay serves to complete an energizing circuit for the hoisting direction switch 576. This circuit may be traced from the supply line 152 by contacts 286 of the bumper switch B2, conductor 540, contacts 555 of the sequence relay L7, contacts of the track type limit switch LSH2, conductor 558, contacts 559 of the trolley limit switch LST, conductor 560, interlock contacts 562 of the lowering relay 193, contacts 570 of the hoisting relay 190 conductor 577, operating coil 578 of the hoisting direction switch 576, and by conductor 565 to the other supply line 153. The hoisting direction switch 576 is thereby closed to energize the hoisting motor 104 through a circuit which may be traced from the positive source of supply, hoisting direction switch 576, series resistances 580 and 581, the armature of the hoisting motor 104, series field winding 582, series brake coil 583, contacts of the field accelerating contactor 212, (which contacts by-pass the resistances 584 and 586) and by resistance 587 to the negative source of supply.

When the hoisting direction switch 576 closed, the contacts 588 operated with this switch were closed to complete an energizing circuit for the contactor 589. This circuit may be traced from the supply line 152 by conductors 174, 176, 590, contacts 588 of the direction switch 576, conductor 591, operating coil 592 of the contactor 589 and by the conductor 593 to the other supply line 153. The contactor 589 is thereupon opened to remove the shunt connection of the motor with the resistance 598, while the contacts 594 operated with this contactor are closed to complete an energizing circuit for the operating coil 595 of the accelerating contactor 596.

It will of course be understood that as soon as the hoisting motor 104 is energized it rotates at low speed in a direction to raise the carriers between the rollers of the run-out table. As soon as the carriers are hoisted above the level of the rollers, the load 12 of steel bars is picked up by the carriers and is thereafter transported to the quenching bath.

Continuing with the operation, the energizing circuit for the accelerating contactor 596 may be traced from the supply line 152 by conductors 174, 176, 597, contacts 568 of the hoisting relay 190, conductor 599, contacts 594 of the contactor 589, contacts 600 of the field accelerating contactor 187, operating coil 595 of the accelerating contactor 596 and by conductor 601 to the other supply line 153. Consequent to the closing of the contactor 596, the resistance 587 is short circuited so that the motor 104 is accelerated to a fraction of its full speed.

The closing of the contacts 602 operated with the accelerating contactor 596 serves to connect the operating coil of the accelerating relay 603 across the armature of the motor 104 and the series resistance 584. This circuit may be traced from the resistance 584 by conductor 605, contacts 602 of the contactor 596, conductor 606, operating coil of the relay 603, and by conductor 607 and the resistor 598 to the other side of the armature of the motor 104. As soon as the counter-electromotive force increases to a predetermined amount, a sufficient voltage is produced across the operating coil of the accelerating relay 603 to operate it so that its contacts 611 are closed. The closing of these contacts serves to complete an energizing circuit for the accelerating contactor 198. This circuit may be traced from the supply line 152 by conductors 174, 176 and 612, contacts 611 of the accelerating relay 603, conductors 210 and 206, operating coil 207 of the accelerating contactor 198 and by conductors 208 and 159 to the other supply line 153. As a result of the closing of the accelerating contactor 198 the resistance 580 is short circuited thereby causing a further acceleration in the speed of the motor 104. It will be remembered that the contacts 211 operated with the accelerating contactor 198 serves to complete an energizing circuit for the accelerating contactor 209. This circuit may be traced from the supply line 152 by conductors 174, 176, 612, contacts 611 of the accelerating relay 603, contacts 211 of the accelerating contactor 198, operating coil of the accelerating contactor 209, and by conductor 159 to the other supply line 153. The accelerating contactor 209 is thereby closed to short circuit the resistance 581 thereby accelerating the motor 104. The hoisting motor 104 will now rotate at its maximum speed to hoist the carriers, and load of work supported thereon above the run-out table. By accelerating the motor in this fashion, the work may be transported from the run-out table to the quenching bath in a minimum amount of time. As will be understood by those skilled in the art, if this is not done the temperature at which the metal is quenched may not be constant for successive loads, and as a result the properties of the material may vary considerably for successive loads.

As soon as the carriers have been hoisted so that they will clear the run-out table, the track type hoist limit switch LSH2 is operated to open its contacts thereby interrupting the circuit to the operating coil 563 of the hoisting relay 190. This relay is thereupon operated to its open position to deenergize the contactors 198, 209, 212 and 596 and the hoisting direction switch 576 and TR2 relay which after a predetermined interval of time, serves to close its contacts 575. The opening of the contacts 588 operated with the hoisting direction switch 576 serves to interrupt the energizing circuit for the accelerating contactor 589. As soon as the hoisting motor 104 is deenergized by the opening of the direction switch 576, the series brake 583 is operated to exert its maximum braking force on the hoist so that the carriers 90 supporting the load 12 are held stationary in their hoisting position.

As soon as the hoisting motor 104 hoists the carriers 90 so that they clear the run-out table 89, but before LSH2 has been operated, the contacts 617 of the hoisting limit switch LSH are operated to their closed position to complete an energizing circuit for the forward direction switch 618 of the trolley motor 105. This circuit may be traced from the supply line 152 by conductors 174, 176 and 619, contacts 620 of the trolley limit switch LST, contacts 617 of the hoisting limit switch LSH, conductor 621, operating coil 622 of the direction switch 618, interlock contacts 624 on the reverse direction switch 625 of the trolley motor, and by conductor 626 to the other supply line 153. Thereafter the trolley motor 105 is accelerated by means of suitable sections of accelerating resistance and cooperating accelerating contactors (not shown). The provision for the energization of the trolley motor 105 as soon as the carriers are hoisted so that they will clear the run-out table 89 is for the purpose of further decreasing the time required to transport the work from the discharge table to the quench tank for the reasons which I have already explained.

As soon as the truck 102 supporting the crane 91 and the carriers 90 has been driven to approximately a position over the quench tank 110, the trolley limit switch LST operates to open its contacts 620 and to close its contacts 629, 630 and 631. The opening of the contacts 620 interrupts the energizing circuit to the forward direction switch 618 which is immediately operated to its open position to deenergize the trolley motor 105.

The closing of the contacts 630 trips the sequence relay L7. This circuit may be traced from supply line 152 by conductors 174, 176, 614 trip coil 615, conductor 615A, contacts 630 and by conductors 616 and 185 to the other supply line 153. The closing of the contacts 631 of LST initiates the operation of the quenching timer 638 in the same manner as described for the master timer 132. The closing of the contacts 629 serves to close the lowering relay 193 of the hoisting motor 104 by reason of the completion of an energizing circuit which may be traced from the supply line 152 by conductors 174, 176, contacts 635 of the relay 636, conductor 637, contacts 629 of the trolley limit switch LST, contacts 639 of the hoisting limit switch LSH, conductor 640, interlock contacts 641 of the hoisting direction switch 576, contacts 575 of the timing relay TR2, operating coil 644 of the lowering relay 193, and by conductor 565 to the other supply line 153. Inasmuch as this circuit was traced through the contacts 575 of the timing relay TR2, it will be obvious that the time required for this relay to close will be less than the time required for the crane to reach its position over the quench tank.

The closing of the contacts 646 and 647 of the lowering relay 193 serves to complete an energizing circuit for the contactor 648. This circuit may be traced from the supply line 153 by conductors 174, 176, 649, contacts 646 and 647 of the lowering relay 193, conductor 651, operating coil 652 of the contactor 648 and by conductor 593 to the other supply line 153. The contactor 648 is thereupon operated to its closed position to connect the resistance 654 in shunt with the resistances 580 and 581, the armature of the hoisting motor, the series field winding 582, the series brake coil 583, and the resistances 584 and 586. This shunt connection is provided so as to insure the proper operating characteristics for the hoisting motor 104 when it is operating to lower the load 12 supported on the carriers 90 into the quenching bath. The closing of the contacts 655 operated with the contactor 648 causes the contactor 589 to be operated to interrupt the emergency braking circuit for the hoisting motor 104 through the braking resistor 598 by reason of the completion of an energizing circuit which may be traced from the supply line 152 by conductors 174, 176 and 590, contacts 655 of the contactor 648, conductor 591, operating coil 592 of the contactor 589, and by conductor 593 to the other supply line 153.

The closing of the contacts 657 operated with the contactor 589 completes an energizing circuit for the lowering direction switch 205. This circuit may be traced from the supply line 152, by conductors 174, 176 and 649, contacts 646 of the lowering relay 193, conductor 658, operating coil 659 of the lowering direction switch 205, conductor 660, contacts 657 of the contactor 589, and by conductor 661 to the other supply line 153. The direction switch 205 is thereupon operated to its closed position to complete an energizing circuit for the hoisting motor 104.

It will be observed that the motor 104 is now connected as a shunt motor and operates to lower the work supported on the carriers into the quenching bath. The armature circuit of the motor may be traced from the positive source of supply, contacts of the lowering direction switch 205, armature of the motor 104, contacts of accelerating contactors 209 and 198, contactor 648, series resistance 654, and by resistance 587 to the negative source of supply. The series field circuit of the motor may be traced from the positive source of supply, lowering direction switch 205, series field winding 582, series brake winding 583, field accelerating contactors 212 conductors 662 and 663, and by the resistance 587 to the negative source of supply.

The motor 104 is prepared for its acceleration to its high speed by the successive operation of the accelerating contactors 198 and 209 to their open positions which results in increasing the resistance of the armature circuit of the motor. The acceleration of the motor 104 begins as the field accelerating contactors 187 and 212 are successively operated to their open positions to increase the resistance of the motor field circuit. The contactor 596 is then closed to short circuit the resistance 587 connected in series with both the armature and field circuits of the motor 104. Thereafter the accelerating contactors 198 and 209 are operated to their closed positions to respectively short circuit the resistances 580 and 581 of the armature circuit of the motor 104 thereby completing the sequence of operation necessary to operate the motor 104 at its full speed in a direction to lower the load.

The energizing circuits which accomplish the sequence of operations just described are as follows: The opening of the contacts 204 operating with the lowering direction switch 205 interrupts the energizing circuit to the accelerating contactor 198 which immediately operates to its open position thereby reinserting in the armature circuit of the motor the resistance 580. The opening of the contacts 211 operated with the accelerating contactor 198 similarly deenergizes the accelerating contactor 209 which operates to its open position thereby reinserting the resistance 581 in the armature circuit of the motor. Similarly, the opening of the contacts 213 operated with the accelerating contactor 209 serves to interrupt the energizing circuit to the field accelerating contactor 212, which contactor operates to insert the resistance 584 in the field circuit of the motor. Similarly, the opening of the contacts 667 operated with the contactors 212 deenergizes the field accelerating contactor 187 which in turn operates to insert in the field circuit the resistance 586. Consequent to the opening of the field accelerating contactor 187, a potential difference appears across the resistance 586 which causes the accelerating relay 129 to be operated to open its contacts. The closing of contacts 600 operated with the field accelerating contactor 187 completes an energizing circuit for the contactor 596. This circuit may be traced from supply line 152 by conductors 174, 176 and 597, contacts 664 of the lowering relay 193, conductors 665, 599, contacts 594 of the contactor 589, contacts 600 of the field accelerating contactor 187, operating coil 595 of the contactor 596 and by conductor 601 to the other supply line 153. Consequent to the closing of this contactor the contacts 602 operated with this contactor serve to connect the accelerating relay 603 so as to be responsive to the counter-electromotive force generated by the motor 104. Consequently, this accelerating relay operates to close its contacts 611, thereby completing an energizing circuit for the accelerating contactor 198. This circuit may be traced from the supply line 152 by conductors 174, 176, 612, contacts 611 of the relay 603, conductor 210, operating coil 207 of the contactor 198, and by conductors 208 and 159 to the other supply line 153. As before, the closing of the contacts 211 of the contactor 198 completes the energizing circuit for the contactor 209 which is again operated to its closed position.

Referring again to the accelerating contactor 596, it will be observed that when the contacts 668 were closed an energizing circuit was completed for the accelerating relay 128. This circuit may be traced from the supply line 152 by conductors 174, 176, 649, contacts 646 of the lowering relay 193, operating coil of the relay 128 conductor 671, contacts 668 of the contactor 596, and to the other supply line 153. The relay 128 is thereby closed to establish a shunt connection around the contacts 646 and 647 of the lowering relay 193 so that the contactor 648 will remain closed after the lowering relay has been operated to its open position. Inasmuch as the operation of the contactor 589 is dependent upon the position of the contacts 655 of the contactor 648, it will be observed that this contactor will remain in its open position until the contacts 655 of the contactor 648 are opened to deenergize the operating coil 592 of the contactor 589. Referring again to the accelerating contactor 209, it will be remembered that the contacts 213 operated with this contactor formerly completed an energizing circuit for the field accelerating contactor 212. However, this circuit is not again completed inasmuch as the accelerating relay 129 was energized as soon as the field accelerating contactor 187 operated to reinsert the resistance 586 in the field circuit of the motor.

The circuits have now been traced for the sequence of operation by which the motor 104 is accelerated to its full speed in a direction to lower the carriers into the quenching bath. As soon as the carriers are lowered below the position at which the track type limit switch LSH2 was opened, it will be observed that this switch will be operated to close its contacts.

As the carriers approach the lower dotted line position shown in Fig. 9 the contacts 639 of the hoisting limit switch LSH are operated to their open position, thereby interrupting the energizing circuit of the lowering relay 193. Consequent to the opening of this relay, there are successively established dynamic braking circuits for controlling the braking effort exerted by the motor 104 in bringing the carriers and the work to a standstill. The lowering direction switch 205 is immediately deenergized by reason of the opening of the contacts 646 of the lowering relay 193. These contacts also serve to deenergize the relay 128. However, it will be remembered that this relay is a time opening relay and its contacts do not immediately open. Therefore a holding circuit for the contactor 649 may be traced from the supply line 152 by conductors 174, 176, 649 and 672, contacts of relay 128, conductors 673, 651, operating coil 652 of the contactor 648, and by conductor 593 to the other supply line 153. A dynamic braking circuit for the motor may therefore be traced from one side of the armature of the motor 104 by accelerating contactor 209 and 198, contactor 648, dynamic braking resistor 654, resistances 584 and 586, series brake coil 583, series field winding 582 and to the other side of the motor armature.

It will be remembered that the accelerating contactors 198 and 209 were operated to their closed positions by reason of the energizing circuits which were traced through the contacts 611 of the accelerating relay 603. These energizing circuits are maintained during the dynamic braking of the motor, inasmuch as the contacts 204 operated with the direction switch 205 are closed to complete their energizing circuits. More specifically the energizing circuit for the contactor 198 may be traced from the supply line 152 by conductor 199, contacts 200 of the relay 201, conductor 202, contacts 203 of the hoisting relay 190, contacts 204 of the lowering direction switch 205, conductor 206, operating coil 207 of the contactor 198, and by conductors 208 and 159 to the other supply line 153. Inasmuch as the operating coil of the contactor 209 is connected to the contacts 211 closed with the accelerating contactor 198 and the conductor 210 to the conductor 206 forming a part of the energizing circuit of accelerating contactor 198, it will be seen how the accelerating contactor 209 is maintained in its closed position.

As the lowering relay 193 was operated to its open position the contacts 192 operated with this relay were closed to complete an energizing circuit for the field accelerating contactor 187. This circuit may be traced from the supply line 152 by conductors 174, 176, 188, contacts 189 on the hoisting relay 190, conductor 191 contacts 192 of the lowering relay 193, conductor 194, operating coil 195 of the field accelerating contactor 187, and by conductor 196 to the other supply line 153. Consequent to the closing of the accelerating contactor 187, the resistance 586 is short circuited to decrease the resistance of the dynamic braking circuit so that the braking effort is thereby increased. Inasmuch as the closing of the contacts of the accelerating contactor 187 serves to short circuit the operating coil of the relay 129, this relay after a predetermined time interval, operates to close its contacts to complete an energizing circuit for the field accelerating contactor 212. This circuit may be traced from the supply line 152 by conductors 174, 176, 214, 215, contacts 213 of the accelerating contactor 209, contacts of the relay 129, operating coil 216 of the field accelerating contactor 212, and by conductor 217 to the other supply line 152. The braking effort exerted by the motor 104 is again increased due to the short circuiting of the resistance 584 by the contactor 212.

As soon as the time opening relay 128 operates to open its contacts, the energizing circuit for the contactor 648 is interrupted so that this contactor immediately opens the loop circuit through the resistance 654, while the opening of the contacts 555 operated with this contactor interrupts the energizing circuit for the contactor 589. Consequently the contactor 589 operates to connect the resistance 598 directly across the armature of the motor 104 and the series field winding 582. This circuit may be termed an emergency braking circuit, inasmuch as the resistance 598 is considerably less than the resistance 654. It will also be observed that the series brake coil 583 is excluded from this circuit so that the brake immediately sets and the crane is quickly brought to a standstill with the carriers 90 occupying the lower dotted line position shown in Fig. 9.

It will be remembered that the contacts 639 of the limit switch LSH in opening resulted in the stopping of the carriers. At the same time the contacts 680 of the hoisting limit switch LSH are operated to their closed position to initiate the operations for the quenching cycle.

The time of the quenching cycle is determined by the setting of the quenching timer 638. This timer began to time as the trolley limit switch contacts 631 closed with the carriers over the quenching tank. The function and operation of this timer are identical with the master timer.

The first step in the quenching cycle is the hoisting of the work and the carriers 90 to the upper dotted line position shown in Fig. 9. The closing of the contacts 680 of the limit switch LSH serves to complete the energizing circuit for the timing relay TR1. This circuit may be traced from the supply line 152 by conductors 174, 176, operating coil 688 of the timing relay TR1, conductors 689, 690, contacts 680 of the limit switch LSH, conductor 691, contacts 692 of the limit switch LST, and by conductor 693 to the other supply line 153. After a short interval of time on the order of ten seconds, as determined by the timing device 131, the timing relay TR1 is operated to close its contacts 694. An energizing circuit is thereby completed for the hoisting relay 190. This circuit may be traced from the supply line 152 by conductors 174, 176, contacts 694 of the timing relay TR1, conductor 697, contacts of the limit switch LSH2, conductor 558, contacts 696 of limit switch LSH, conductors 697 and 560, interlock contacts 562 of the lowering relay 193, operating coil 563 of the hoisting relay 190, and by conductor 565 to the other supply line 153. The hoisting relay 190 is thereupon operated to open its contacts 189 and 203, and to close its contacts 566, 567, 568 and 570. The contacts 566 serve to complete an energizing circuit for the timing relay TR2. This circuit may be traced from the supply line 152 by conductors 174, 176, 698, contacts 566 of the hoisting relay 190, operating coil of the timing relay TR2 and by conductor 565 to the other supply line 153. The timing relay TR2 is thereupon operated to open its contacts 575 so that the energizing circuit for the lowering relay 193 cannot be completed until after the expiration of the time interval required for the closing of the timing relay TR2.

The function of the other contacts on the hoisting relay 190 is the same as has been described above, i.e., when the work was hoisted from the run-out table. Briefly, the sequence of operation that is initiated is as follows: The hoisting direction switch 576 is first closed to connect the hoisting motor 104 in series with the resistance 580, 581, 584, 586 and 587. As soon as the hoisting direction switch 576 is closed, the contactor 589 is energized to remove the shunt connection through the resistance 598 from around the armature of the hoisting motor 104 and its series field winding 582. Thereafter the hoisting motor is accelerated by the successive closing of the contactors 596, 198 and 209.

As soon as the motor 104 has hoisted the carriers to the upper dotted line position shown in Fig. 9, the contacts 696 of the limit switch LSH are operated to deenergize the hoisting relay 190. It may here be observed that these contacts were open when the carriers were in position at the run-out table, but inasmuch as the contacts 559 of the trolley limit switch LST were closed with the crane over the run-out table, the contacts 696 of the limit switch LSH were bypassed by the contacts 559 of the trolley limit switch LST. In the present case, of course, it will be observed, that the contacts 696 of the hoisting limit switch LSH are effective to deenergize the hoisting relay 190. Consequently, as soon as the hoisting relay 190 is operated to its open position, the hoisting direction switch 576 and the accelerating contactors are opened in the same manner as described when the upper limit was reached above the run-out table.

With the hoist in the upper dotted line position the contacts 680 of the limit switch LSH are operated to their open position thereby deenergizing the timing relay TR1 which immediately operates to open its contacts 694. At the same time the contacts 639 of the hoisting limit switch LSH are operated to their closed position partially to complete an energizing circuit for the lowering relay 193. This circuit is completed after the expiration of a predetermined time interval determined by the setting of the timing relay TR2, which relay serves to close its contacts 575 a predetermined time interval after the contacts 566 were operated to their open position when the hoisting relay 190 was deenergized. This circuit may be traced from the supply line 152 by conductors 174, 176, 632, quench transfer switch 633, conductor 634, contacts 635 of the relay 636, conductor 637, contacts 629 of the trolley limit switch LST, contacts 639 of the hoisting limit switch LSH, conductor 640, interlock contacts 641 of the hoisting direction switch 576, contacts 575 of the timing relay TR2, operating coil 644 of the lowering relay 193, and by conductor 565 to the other supply line 153.

Consequent to the closing of the lowering relay 193, the circuits described above are again completed for the lowering operation, and the hoisting motor 104 is thereby accelerated to lower the carriers to the lower dotted line position shown in Fig. 9.

It will be understood that the carriers are continuously driven between the dotted line positions shown in Fig. 9 with a short interval of time introduced between each motion. It is in this manner that the quenching fluid is caused to wash over the sides of the work undergoing the quenching so that air pockets in the quenching fluid are avoided and the result is a uniform quality of the material undergoing the quenching.

As soon as the interval of time has expired for which the quenching timer 638 has been set, this timer times out to close its contacts 700, thereby completing an energizing circuit for the operating coil 701 of the relay 636. This circuit may be traced from the supply line 152 by conductor 702, contacts 700 of the quenching timer 638, conductor 703, operating coil 701 of the relay 636 and by conductor 185 to the other supply line 153. The relay 636 is thereupon operated to close its contacts 704, 705 and 706 and to open its contacts 635.

Inasmuch as any desired time may be selected by suitably adjusting the quenching timer 638, it will be seen that the timer may time out when the hoisting motor 104 is operating to hoist the carriers 90; or the timer may time out when the motor 104 is lowering the carriers. It will first be assumed that the carriers 90 are being lowered when the quenching timer times out. The opening of the contacts 635 of the relay 636, it will be observed, serves to deenergize the lowering relay 193 which is thereupon operated to open its contacts 646, 647, 664 and to close its contacts 192 and 562, and, as described above, the motor 104 is quickly brought to a standstill. At the same time, the closing of the contacts 706 operated with the relay 636 serves to complete an energizing circuit for the operating coil 688 of the timing relay TR1. This circuit may be traced from the supply line 152 by conductors 174, 176, operating coil 688, conductor 689, contacts 706 of the relay 636, conductor 691, contacts 692 of the limit switch LST and by conductor 693 to the other supply line 153. It will also be observed that the closing of the contacts 704 of the relay 636 serves to by-pass the contacts 696 of the hoisting limit switch LSH so that the work may be immediately hoisted from the quenching tank 110. Therefore, as soon as the timing relay TR1 is operated to close its contacts 694 an energizing circuit may be traced for the hoisting relay 190. This circuit may be traced from the supply line 152 by conductors 174, 176, contacts 694 of the timing relay TR1, conductor 697, hoisting limit switch LSH2, contacts 704 of the relay 636, interlock contacts 562 of the lowering relay 193, operating coil 563 of the hoisting relay 190, and by conductor 565 to the other supply line 153. The hoisting relay 190 again closes and serves to energize the motor 104 in a direction to hoist the carriers from the quenching bath by means of the circuits described above. It will be seen that the closing of the contacts 704 operated with the relay 636 serves to complete the energizing circuit to the hoisting relay 190, this circuit having been traced through the contacts 694 of the timing relay TR1, and the track type limit switch LSH2. The control of the motor 104 is thereby transferred from the contacts 696 of the hoisting limit switch LSH to LSH2, so that the hoisting motor 104 will continue to hoist the carriers from the quenching bath until they reach a position above the quenching tank 110, as determined by the position of the track type limit switch LSH2.

It will now be assumed that the quenching timer 638 times out to close its contacts 700 while the carriers are being hoisted. The relay 636 is immediately energized and it will be observed that the control of the energization of the hoisting motor 104 is again taken away from the contacts 696 of the hoisting limit switch LSH inasmuch as the circuit to the hoisting relay 190 is again completed through the contacts 694 of the timing relay TR1, the track type limit switch LSH2, contacts 704 of the relay 636, interlock contacts 562 of the lowering relay 193 operating coil 563 of the hoisting relay 190, and by conductor 565 to the other supply line 153. The motor 104 will therefore continue to hoist the carriers from the quenching bath inasmuch as the opening of the contacts 635 and the closing of the contacts 705 both operated by the relay 636, serves to transfer the control of the upper limit of operation of the motor from the limit switch contacts 639 of the hoisting limit switch LSH to the hoisting limit switch LSH2.

The closing of the contacts 705 of the relay 636 serves partially to complete an energizing circuit for the forward direction switch 618 of the trolley motor 105. This circuit is completed by the closing of the contacts 617 of the hoisting limit switch LSH as soon as the carriers 90 are hoisted so that they will clear the quenching tank 110. This circuit may be traced from the supply line 152 by conductors 174, 176, 632, quench transfer switch 633, conductors 634 and 710, contacts 705 of the relay 636, conductor 711, contacts 712 of the trolley limit switch LST, contacts 617 of the hoisting limit switch LSH, conductor 621, operating coil 622 of the forward direction switch 618, interlock contacts 624 on the reverse direction switch 625, and by conductor 626 to the other supply line 153. The forward direction switch 618 is thereupon closed to energize the trolley motor 105 in a direction to drive the crane towards the discharge table (not shown).

As soon as the carriers have been hoisted above the quenching tank, the contacts of the track type limit switch LSH2 are operated to their open position to deenergize the hoisting relay 190. Consequent to the opening of this relay, the motor 104 is deenergized and brought to a standstill as before described.

As soon as the crane approaches a position over the discharge table, the contacts 712 of the trolley limit switch LST are operated to their open position to deenergize the forward direction switch 618. The trolley motor 105 is thereby deenergized and the series brake 105A operates to bring the crane to a standstill. At the same time the contacts 630 of the limit switch LST are operated to their closed position to complete an energizing circuit for the lowering relay 193. This circuit may be traced from the supply line 152 by conductors 174, 176, conductors 634 and 710, contacts 705 of the relay 636, conductors 714, 715, contacts 716 of the trolley limit switch LST, contacts 717 and 639 of the hoisting limit switch LSH, conductor 640, contacts 641 of the hoisting direction switch 576, contacts 575 of the timing relay TR2, operating coil 644 of the lowering relay 193 and by conductor 565 to the other supply line 153. As a result of the closing of the lowering relay 193, the lowering circuits are again established to lower the work to the discharge table.

The discharge rack is arranged at a slightly greater elevation than is the run-out table 89. Therefore, as soon as the work is lowered onto the discharge rack by reason of the carriers passing between its work supports the contacts 717 of the hoisting limit switch LSH are operated to their open position to deenergize the hoisting motor 104. As before described, the motor is decelerated and brought to rest with the carriers occupying a position corresponding to their position between the rollers of the run-out table 89.

The crane is now driven to the run-out table 89 by reason of the contacts 720 of the hoisting limit switch LSH, which contacts were closed as the carriers deposited their load on the discharge rack. The circuit thereby completed for the reverse direction switch 625 of the trolley motor may be traced from the supply line 152 by conductors 174, 176, 619, contacts 721 of the limit switch LST, contacts 720 of the hoisting limit switch LSH, operating coil 723 of the reverse direction switch 625, interlock contacts 724 of the forward direction switch 618, and by conductor 626 to the other supply line 153. The trolley motor 105 is thereupon caused to rotate in a direction to drive the crane toward the run-out table 89.

It will be observed that as the crane passes over the quench tank, the contacts 629 of the trolley limit switch LST will be operated to their closed position. It will be remembered that these contacts closed the lowering relay 193 to initiate the lowering of the carriage into the quench bath. This may not be done, however, as the crane trolleys from the discharge table to the run-out table, inasmuch as the contacts 635 of the relay 636 have been operated to their open position.

As soon as the crane is driven to a position in readiness for the next load from the high heat chamber, the contacts 721 of the trolley limit switch LST are operated to their open position to deenergize the reverse direction switch 625 of the trolley motor 105. As before the motor 105 is deenergized and its series brake again operates to bring the crane to a standstill in position at the run-out table.

A complete cycle of operations has now been described and the manner in which the furnace automatically handles the material explained. It will of course be understood that the furnace operates continuously in the manner described as long as additional loads of metal bars are placed on the charging rack.

The initial heating of the furnace

It will be remembered that the cycle of operations just described began with the assumption that the furnace had been heated to its normal operating temperature before the cycle was started. In ordinary practice when the furnace is cold and a supply of work is on hand for the heat treatment, it is necessary to energize the heating resistances for a period of time before the cycle of operations is initiated. If the line switches 150 and 151 are closed, it will be remembered that the undervoltage relay 221 is immediately operated to complete the energizing circuit for the heating resistances 228. However, if the temperature of the furnace is increased without continually rotating the rollers, there is danger of unequal expansion of the rollers which may cause the rollers to bind in their bearings. Therefore, on the initial operation, the line switches 150 and 151 are closed to complete the energizing circuit for the heating resistor contactor 227. As before, the undervoltage relay 154 also operates to energize the supply lines 152 and 153. The push button station 426 is then operated to open its contacts thereby deenergizing the conductors 152 and 427 by means of which the automatic cycle is controlled, while it closes its contacts 730 to complete an energizing circuit for the forward direction switch 169 of the roll motor 65. This circuit may be traced from the line switch 150, contacts of the undervoltage relay 154, contacts 730 of the push button 426, conductors 731 and 482, operating coil 430 of the forward direction switch 169, interlock contacts 431 on the reverse direction switch 432, and by conductors 433, 165 and 159 to the other supply line 153. The roll motor 65 thereupon operates at low speed and serves to rotate the rollers of the roll table in the forward direction.

As soon as the temperatures of the preheat chamber and of the high heat chamber have reached their normal values, the push button station 426 is operated to its original position, thereby deenergizing the forward direction switch 169 of the roll motor. It is now only necessary to depress the start button 161 to initiate the operation of the automatic cycle for transporting the work through the preheat chamber, the high heat chamber, the quenching tank and to the discharge rack.

Manual operation

Should the work become jammed in one of the heating chambers, a push button 735 is provided so that the raise direction switch 452 on the end doors may be closed. Assuming that the push button 735 is depressed, it will be observed that an energizing circuit may be completed for the direction switch 452. This circuit may be traced from the supply line 152, by conductor 736, contacts of the push button 735, conductor 737, contacts 457, of the end door limit switch LSD, conductors 458, operating coil 459 of the direction switch 452, interlock contacts 460 of the lowering direction switch 281 and by conductors 223 and 185 to the other supply line 153. The direction switch 452 thereupon closes to energize the motor 71 in a direction to raise the end doors. After the jam has been broken or any other abnormal condition has been corrected, the end doors may again be lowered by depressing a push button 740. The energizing circuit for the lowering direction switch 281 may then be traced from the supply line 152, by conductors 501, and 741, contacts of the push button 740, conductor 742, contacts 474 of the limit switch LSD, conductor 505, contacts 506 of bumper switch B2, conductor 507, interlock contacts 508, of the direction switch 452, operating coil 509 of direction switch 281 and by conductors 223 and 185 to the other supply line 153. The direction switch 281 thereupon operates to energize the motor 71 in a direction for the lowering of the end doors. The contacts 474 of the end door limit switch LSD again serve to deenergize the motor 71 as the doors reach their lower limit.

Selective control quenching

By operating the quench transfer switch to its upper position "no quench" a transfer of control circuits is effected so that the crane will thereafter function to transport charges of work from the run-out table directly to the discharge rack and return to the run-out table without stopping at the quench tank. Assuming now that a charge has arrived on the run-out table 89 to close the bumper switch B3 which switch, it will be remembered, initiates the hoisting of the crane. The limit switch LSH2 deenergizes the hoisting motor 104 while the contacts 617 of LSH energize the forward direction switch 618 of the trolley motor 105. As the crane reaches the quench tank 110, the trolley limit switch contacts 620 are opened. However, the forward direction switch 618 remains energized due to a circuit completed through the transfer switch 633. This circuit may be traced from the supply line 152 by conductors 174, 176, 632, switch 633, conductors 715, 714 and 711, contactor 712 of LST, contacts 617 of LSH, conductor 621, operating coil 622 of direction switch 618, interlock contacts 624 and by conductors 626 to the other supply line 153.

The crane, therefore, is driven to the discharge rack where it is deenergized by the opening of the trolley limit switch contacts 712.

The transfer switch 633 also transfers the control of the hoisting motor LST contacts 629 to LST contacts 716 so that the crane cannot lower as it is trolleying towards the discharge rack.

After the charge has been placed on the discharge rack the crane is returned to the run-out table in the manner that has already been explained.

While I have described what I at present consider the preferred embodiment of my invention, it will be obvious to those skilled in the art that various changes and modifications may be made without departing from my invention, and I, therefore, aim in the appended claims to cover all such modifications as fall within the true spirit and scope of my invention.

What I claim as new and desire to secure by Letters Patent of the United States, is:

1. The combination with a roll table having a plurality of rollers for the support of charges of work, of a roller driving motor, means for energizing said motor for slow speed operation, means for energizing said motor for high speed operation, and means for preventing the operation of said motor at high speed except when said rollers occupy a predetermined angular position.

2. The combination with a heat treating apparatus having a heating chamber and a plurality of rollers forming a roller hearth for the support of charges therein, a driving motor for rotating said rollers, means for connecting said motor for low speed operation, means for controlling the energization of said motor for operation first in one direction and then in the other direction, timing means, and means responsive to the operation of said timing means and to the position of said rollers for deenergizing said motor when the rollers occupy a predetermined angular position.

3. In combination with an electrically operated furnace provided with a roller hearth, of a roller driving motor, a limit switch operated by said motor for controlling the energization of said motor for low speed operation first in one direction and then in the other direction, a timing means responsive to a condition of operation of said furnace for rendering said limit switch effective only for a predetermined time interval, and means for energizing said motor for rotation in a single direction.

4. In combination, a roll table, a driving motor therefor, means for controlling the energization of said motor for high speed operation, means for controlling the energization of said motor for low speed operation, a limit switch arranged to be driven by said motor during low speed operation, means responsive to the operation of said limit switch for periodically reversing said motor, and means for mechanically disconnecting said limit switch from said motor for the high speed operation of said motor.

5. The combination with an electrically operated furnace provided with a plurality of rollers arranged to form a roll table throughout the length of said furnace, of a direct current roller driving motor, series and shunt resistances for the armature of said motor, a limit switch for controlling the energization of said roller motor, means for connecting said resistances respectively in series and shunt relation with the armature of said motor for low speed operation of said motor, means responsive to said aforementioned means for mechanically connecting said limit switch to said motor, whereby said limit switch is operated to control the energization of said motor for rotation at low speed first in one direction and then in the other direction to oscillate said rollers.

6. In combination, a work supporting roller hearth, a roller driving motor therefor, means for energizing said motor for slow speed operation first in one direction and then in the other direction, timing means therefor for deenergizing said motor after a predetermined interval of time and means positionally responsive to said rollers for energizing said motor for operation at high speed in a single direction, and means responsive to the position of said work for braking said motor to a standstill.

7. In combination, a roller hearth, a driving motor therefor, means for operating said motor at low speed and means for periodically reversing said motor during said low speed operation, timing means for determining the length of time said motor shall operate at low speed, and means responsive to said timing means and to the position of said rollers for deenergizing said motor and thereafter energizing it for operation at high speed in a single direction.

8. In combination, a variable speed motor arranged for operation in both directions of rotation, a sequence relay, connecting means responsive to the operation of said relay for connecting said motor for low speed operation, a limit switch, a clutch, clutch operating means responsive to said connecting means for mechanically connecting said limit switch to said motor, timing means, and means responsive to said timing means and to the position of said limit switch for deenergizing said motor after the expiration of a predetermined time interval.

9. In combination, a heat treating furnace having walls arranged to form a plurality of heating chambers, a roller hearth extending through said furnace for the support of charges of work within each of said chambers, a charging mechanism for placing charges of work in one of said chambers, a variable speed roller-driving motor arranged for operation in both directions of rotation, means for connecting said motor for rotation at low speed first in one direction and then in the other direction, and means for connecting said motor for high speed operation only when said charges are a predetermined distance from the ends of the respective heating chambers.

10. In combination with a roll table arranged for the transport of material from one material treating position to other material treating positions, a driving motor for said roll table, bumper switches for all but the first of said material treating positions, a direction switch for controlling the energization of said roll motor, an energizing circuit for said direction switch, circuit interrupting means for each of said bumper switches included in said circuit responsive to the operation of its corresponding bumper switch for deenergizing said direction switch.

11. In combination with a roll table arranged for the transport of material from one material treating position to other material treating positions, a driving motor for said roll table, bumper switches for all but the first of said material treating positions, a direction switch for controlling the energization of said roll motor, an energizing circuit for said direction switch, circuit interrupting means for each of said bumper switches connected in said circuit and responsive to the operation of its corresponding bumper switch for deenergizing said direction switch, and by-passing means for all but the last of said circuit interrupting means whereby said bumper switches can successively control the energization of said motor.

12. In combination with a material modifying apparatus having a plurality of rollers arranged to form a roll table, a motor for driving said rollers, a charging mechanism for placing charges of work on said roll table, motor operating means for said charging mechanism, a direction switch for controlling the energization of said motor operating means, a sequence relay having an operating coil and a trip coil, connections completed by operation of said relay for energizing said direction switch, means for initiating automatic operation of said motor comprising a manually operable switch for closing said relay, a limit switch responsive to a predetermined operation of said motor for deenergizing said direction switch, means for energizing the trip coil of said relay, and contacts responsive to the arrival of a charge of work at a predetermined position on said roll table for by-passing said relay contacts to complete said connections for energizing said direction switch, and means responsive to the operation of said direction switch for energizing said operating coil of said relay.

13. In combination with a material modifying apparatus having a plurality of rollers arranged to form a roll table, a motor for driving said rollers, a charging mechanism for placing charges of work on said roll table, motor operating means for said charging mechanism, direction switches for controlling the energization of said motors, means for initiating automatic operation of said motor operating means comprising a manually operable switch, a relay having operating and trip coils, an energizing circuit for said operating coil arranged to be completed by said manually operable switch, an energizing circuit completed by operation of said relay for operating one of said direction switches to initiate operation of said charging mechanism, means responsive to the completion of said charging operation for energizing said roll motor for rotation first in one direction and then in the other direction, timing means, means responsive to said timing means for energizing said motor to rotate said rollers in a direction to move the material along said roll table, stopping means responsive to the arrival of the material at a predetermined point for deenergizing said motor and for energizing said motor operating means, a second stopping means located a predetermined distance from said first stopping means, a relay responsive to the operation of said first stopping means for transferring the functions of said first stopping means to said second stopping means.

14. In combination with a plurality of rollers arranged to form a roll table for the support of material, a motor for driving said rollers, forward and reverse direction switches for controlling the energization of said motor, a sequence relay provided with operating and trip coils, means for energizing said operating coil, connecting means responsive to the operation of said relay for connecting said motor for low speed operation, a circuit completed by the operation of said relay for energizing one of said direction switches, a limit switch responsive to the operation of said motor for successively connecting and disconnecting said direction switches in said circuit so that said motor operates first in one direction and then in the other direction, timing means, means responsive to said timing means for partially completing an energizing circuit for said trip coil, the said limit switch operating to complete said last mentioned circuit when said rollers occupy a predetermined position.

A FREDERICK BETKE.